United States Patent [19]
Reintjes et al.

[11] Patent Number: 4,728,727
[45] Date of Patent: Mar. 1, 1988

[54] MODIFIED LIGNOSULFONATE DRILLING FLUID DISPERSANTS AND PROCESS FOR THE PREPARATION THEREOF

[75] Inventors: Marten Reintjes, Shelton, Wash.; Craig D. Marken, Tananger, Norway

[73] Assignee: ITT Corporation, New York, N.Y.

[21] Appl. No.: 7,772

[22] Filed: Jan. 28, 1987

[51] Int. Cl.$^4$ .................................. C08H 5/02
[52] U.S. Cl. .................. 530/500; 530/507; 252/8.514
[58] Field of Search .............. 530/500, 507; 252/8.514

[56] References Cited

U.S. PATENT DOCUMENTS 3,087,923  4/1963  King et al. ............ 530/500 X
3,109,742  11/1963 King et al. ............ 530/500 X
4,219,471  8/1980  Detroit ................. 530/501 X
4,505,825  3/1985  Detroit ................. 530/500 X Primary Examiner—Earl Nielsen
Attorney, Agent, or Firm—Peter A. Abruzzese

[57] ABSTRACT

The present invention relates to modified lignosulfonate materials and the process for their preparation. These modified lignosulfonates result from the sulfonation of ultrafiltered lignosulfonates by reaction with sulfite-bisulfite salts. The removal of sugars and other low molecular weight impurities makes formation of these new modified lignosulfonates more complete. These derivative materials when reacted with metal salts such as chromium, ferrous, ferric, titanium, and zirconium produce oil well drilling fluid dispersant products with significantly improved performance and thermal properties.

26 Claims, 17 Drawing Figures

MOLECULAR WEIGHT DISTRIBUTION OF ULTRAFILTERED
SODIUM LIGNOSULFONATE

RETENTION TIME [SEC.] ⟶

MOLECULAR WEIGHT DISTRIBUTION OF SULFONATED/
ULTRAFILTERED SODIUM LIGNOSULFONATE

RETENTION TIME [SEC.] ⟶

MOLECULAR WEIGHT DISTRIBUTION OF CRUDE
NaSSL DERIVED CrLS (4% Cr)

RETENTION TIME (SEC.) ⎯⎯⎯→

MOLECULAR WEIGHT DISTRIBUTION OF SULFONATED
NaSSL DERIVED CrLS (4% Cr)

RETENTION TIME (SEC.) ⎯⎯⎯→

MOLECULAR WEIGHT DISTRIBUTION OF ULTRAFILTERED NaSSL DERIVED CrLS (3.4% Cr)

RETENTION TIME (SEC.) ⟶

MOLECULAR WEIGHT DISTRIBUTION OF SULFONATED/ ULTRAFILTERED NaSSL DERIVED CrLS (3.4% Cr)

RETENTION TIME (SEC.) ⟶

MOLECULAR WEIGHT DISTRIBUTION OF CRUDE
NaSSL DERIVED Fe [III] LS

RETENTION TIME (SEC.) ⟶

MOLECULAR WEIGHT DISTRIBUTION OF SULFONATED
NaSSL DERIVED Fe [III] LS

RETENTION TIME (SEC.) ⟶

MOLECULAR WEIGHT DISTRIBUTION OF ULTRAFILTERED
NaSSL DERIVED Fe [III] LS

RETENTION TIME (SEC.) ⟶

MOLECULAR WEIGHT DISTRIBUTION OF SULFONATED/
ULTRAFILTERED NaSSL DERIVED Fe [III] LS

RETENTION TIME (SEC.) ⟶

MODIFIED LIGNOSULFONATE DRILLING FLUID DISPERSANTS AND PROCESS FOR THE PREPARATION THEREOF

BACKGROUND OF THE INVENTION

This invention relates to modified lignosulfonate materials and a process for their preparation. These modified lignosulfonates result from the sulfonation of purified lignosulfonates by reaction with sulfite-bisulfite salts. The removal of sugars and other low molecular weight impurities provides a greater concentration of these modified lignosulfonates. These materials are useful in preparing oil well drilling fluid dispersant products with significantly improved performance and thermal properties.

A well fluid for use in rotary drilling must have sufficient viscosity that it easily carries rock chips and material loosened by the drill bit out to the surface of the ground by flow of the fluid, and it should be thixotropic so that when drilling is stopped at any time, the fluid will gel and prevent chips from settling around the drill bit. The apparent viscosity or resistance to flow of drilling muds is the result of two properties, plastic viscosity and yield point. Each of these two properties represents a different source of resistance to flow. Plastic viscosity is a property related to the concentration of solids in the fluid, whereas yield point is a property related to the interparticle forces. Gel strength, on the other hand, is a property that denotes the thixotropy of mud at rest. The yield point, gel strength, and, in turn, the apparent viscosity of the mud, commonly are controlled by chemical treatment with materials such as complex phosphates, alkalies, mined lignites, plant tannins, and modified lignosulfonates. It has been found that chromium modified lignosulfonate as well as a mixed metal lignosulfonate of chromium and iron are highly effective in controlling the viscosity of drilling fluids. Because chromium is a heavy metal, there is concern about its dispersion in the natural environment. Its status is continually being reviewed by various governmental agencies. Various governmental authorities around the world contemplate stringent controls upon the use of compounds containing chromium in oil and gas well drilling lest the fluids containing these agents inadvertently contaminate the environment.

Lignosulfonate derived oil well drilling fluid dispersants have been extensively studied and used. Such dispersants have been produced from the oxidation of thermally treated lignosulfonates in the presence of metal salts of chromium, iron, aluminum and copper. See for example U.S. Pat. Nos. 2,935,473 and 3,087,923, both to King et al. Lignosulfonates without modification have been used to produce titanium and zirconium based dispersants as shown in U.S. Pat. No. 4,220,585 to Javora et al. Subsequent dispersants were derived from fractionated and fermented spent sulfite liquors in conjunction with certain of the aforementioned metals, as shown in U.S. Pat. Nos. 3,244,623 and 3,278,425, both to King et al. The desugaring of lignosulfonates for use as dispersants by reaction with tetravalent sulfur compounds (e.g., $SO_2$) is disclosed in U.S. Pat. Nos. 3,505,243 and 3,668,123, both to Steinberg et al. and assigned to the present assignee. Ultrafiltration of spent sulfite liquors using equipment developed by De Danske Sukkerfabrikker (DDS) is covered by a number of foreign patents. U.S. Pat. No. 3,244,623 also discloses dialysis or fractionation for removing carbohydrates (i.e. sugars). However, simple dialysis is not sufficiently rapid to be used in commercial filtration of spent sulfite liquors.

SUMMARY OF THE INVENTION

It has now been discovered that a dispersant for drilling fluids having both improved dispersant properties and increased thermal stability may be prepared from spent sulfite liquor which has been both ultrafiltered and sulfonated. The improved dispersant properties are not achieved with either ultrafiltration or sulfonation alone and are accordingly attributed to a synergistic result from the combination of steps.

The modified lignosulfonate derivatives used in preparing improved oil well drilling fluid dispersants originate from stripped spent sulfite liquor from production pulping processes. This stripped liquor contains approximately 55% (solids basis) lignosulfonate. This liquor in accordance with this invention is purified by a variety of ultrafiltration techniques to provide concentrate having substantially all of the sugar removed and a chain length distribution of approximately 2.5 or less. After ultrafiltration, the lignosulfonate content ranges from 80-100%. These liquors of increased purity are sulfonated with a bisulfite at temperatures of between 80° and 200° C., preferably at temperatures up to 165° C. The ultrafiltration step is utilized in the present invention to permit a more direct reaction between the lignosulfonate and bisulfite by removing the sugars and other low molecular weight impurities and to reduce the average chain length distribution of the lignosulfonates preferably to approximately 2.5 or less. These low molecular weight materials consume chemical reagents needed for more complete modification of lignosulfonate. The reaction with purified lignosulfonate results in modified material which exhibits chemical properties that differ from lignosulfonate originating from the pulping process. In turn, these modified lignosulfonate derivatives are reacted with metal salts and oxidizing agents to yield further modified lignosulfonate materials with significantly improved dispersant properties. The higher the purity of the ultrafiltered liquors, the better the resultant dispersant properties. The metalized modified lignosulfonate dispersants also exhibit improved thermal stabilities which extend their range of utility.

With the techniques of sulfonation and ultrafiltration, modified lignosulfonates containing chromium, iron, titanium, and zirconium can be made with improved dispersant properties. Without the modification by sulfonation, the ultrafiltered liquors alone result in dispersants with exceedingly poor properties. The sulfonation reaction combined with the ultrafiltration step has a truly synergistic effect on the resultant dispersant performance.

DETAILED DESCRIPTION OF THE PREFERRED EMBODIMENT

Figure 1:
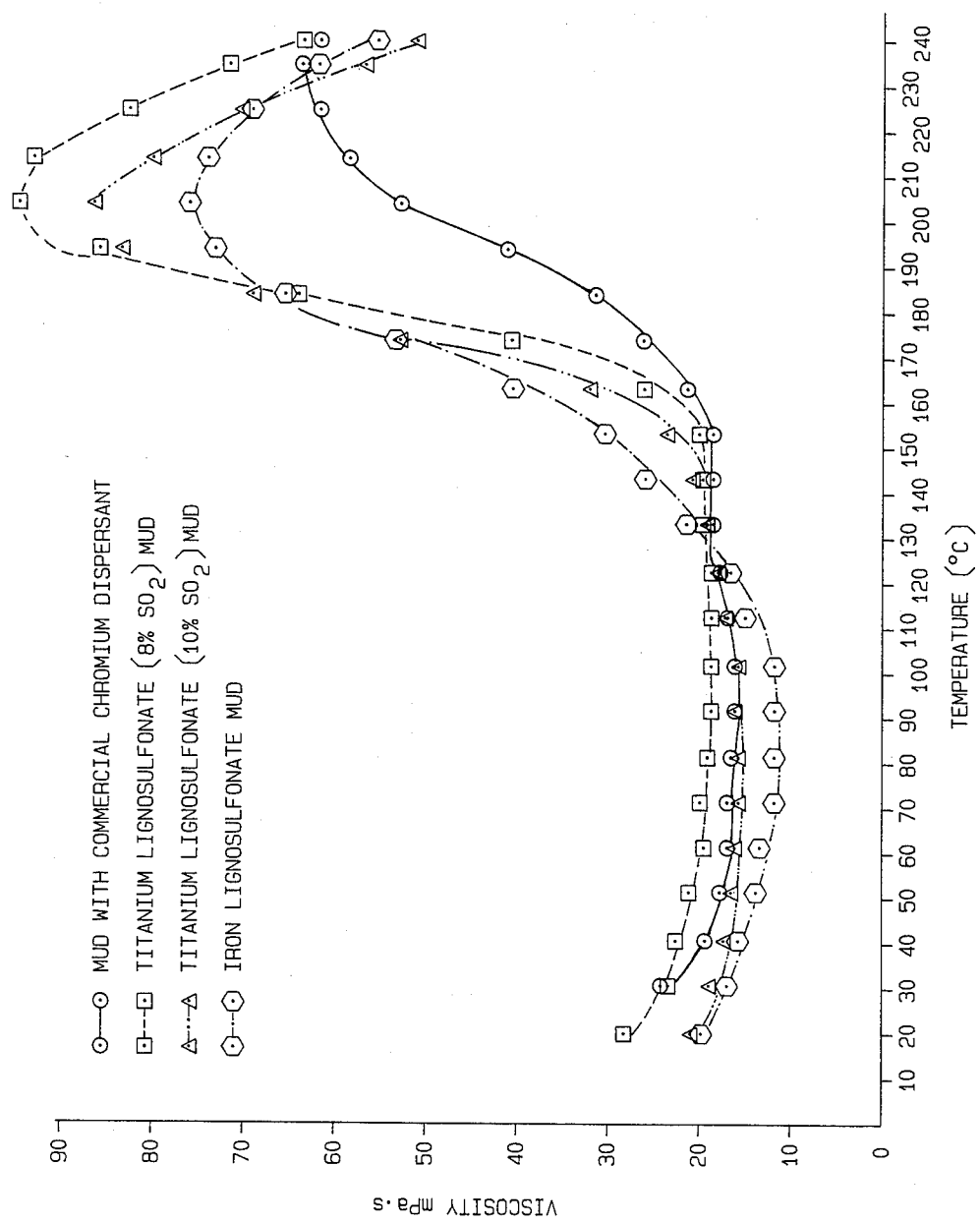
FIG. 1 is a graph of the viscosity of drilling muds containing the modified lignosulfonates in accordance with this invention, and a mud containing a commercially available chromium based dispersant, as a function of temperature as measured on a Fann-50B Viscometer.

The novel process of the present invention involves the sequential steps of ultrafiltering soluble base spent sulfite liquor, from which a substantial proportion of the $SO_2$ has been removed, to produce a low molecular weight fraction containing most of the sugars and a high molecular weight lignosulfonate fraction having an average molecular weight ranging from approximately 80,000 to approximately 125,000 and a chain length distribution of approximately 2.5 or less, said ultrafiltration substantially raising the solids content of the high molecular weight lignosulfonate fraction by separating a substantial portion of the water therefrom, sulfonating the concentrated high molecular weight lignosulfonate fraction by reaction with a bisulfite at temperatures of 80° to 200° C. and reacting said sulfonated concentrated high molecular weight lignosulfonate fraction with a metal salt in the presence of an oxidizing agent, said metal salt being selected from the group consisting of chromium, ferrous, titanium, and zirconium salts, to produce a sulfonated, corresponding metal lignosulfonate dispersant. The drilling fluid dispersants of the present invention are the product of the foregoing process.

The term "soluble-base" spent sulfite liquor (SSL) as used herein refers to spent sulfite liquor derived from the pulping of wood with a solution containing sulfurous acid and sodium, ammonium or potassium bisulfite. Such spent sulfite liquors have a relatively low pH (e.g., 1.5–4.0) and the lignin contained therein is considered to be in the form of lignosulfonic acids and soluble-base lignosulfonic acid salts. Such liquors also contain large quantities of reducing sugars, predominantly mannose and glucose, derived through hydrolysis of the carbohydrate fraction of the wood by the acidic cooking liquor. The term "soluble-base" spent sulfite liquor also refers to spent sulfite liquors which were originally obtained by the acid-sulfite pulping of wood with sulfurous acid-bisulfite solutions of insoluble bases but which were subsequently converted to soluble base. Examples of such liquor would include ammonia and sodium-base spent sulfite liquors prepared from calcium-base spent sulfite liquor by (1) treatment with ammonium or sodium sulfate or sulfite under pH conditions such that the calcium was substantially precipitated, or (2) cation exchange.

The thin SSL from the pulping of wood in digesters is fed to a continuous steam stripper where a high proportion of the $SO_2$ is removed and returned to the acid making system for the pulping operation. Such a stripping operation is well known and may be carried out in conventional fashion. It is shown, for example, in U.S. Pat. No. 2,710,254.

Ultrafiltration of spent sulfite liquor is necessary to obtain a purified raw material which is suitable for production of chromeless oil well drilling mud dispersants and improved chromium based drilling mud dispersants. Simple fermentation of the crude SSL to remove sugars is not sufficient for the production of these dispersants. Removal of the remaining low molecular weight components of the fermented SSL is required.

Ultrafiltration is a membrane filtration process performed at low pressure (100–1000 kPa) with relatively open membranes. The purpose of ultrafiltration is to separate and concentrate large molecules from small ones. This technology is used in the present invention for the separation and purification of lignosulfonates from spent sulfite liquor (SSL).

The thermal decomposition of oil well drilling fluid dispersants can lead to the evolution of carbon dioxide ($CO_2$). When this occurs the $CO_2$ decreases the pH of the aged mud with a concomitant loss of mud properties. This evolved $CO_2$ can originate from two potential sources in the SSL based dispersants. One source is the sodium lignosulfonate. The other source is residual sugars or sugar derivatives. Therefore isolating the main $CO_2$ source requires the separation of the sodium lignosulfonate from the sugars in the crude SSL.

The initial steps of the process of the present invention are described in Examples 1–4 as follows:

EXAMPLE 1

Ultrafiltration

Steam-stripped spent sulfite liquor from production of a paper pulp at about 10% solids was ultrafiltered using an Abcor SWM-100 membrane (MW cutoff 25,000 daltons). The liquor was pumped through the module at 70° C. to a final concentration of the retentate of 30% solids. Chemical analyses of this starting material, and of the concentrate (retentate) and filtrate (permeate) obtained therefrom are shown in the following Table.

TABLE IA

| (All FIGS. as % found on dry basis) | | | |
|---|---|---|---|
| | Starting Liquor | Concentrate | Permeate |
| Sodium | 4.7 | 3.6 | 5.8 |
| Methoxyl | 8.45 | 11.68 | 3.13 |
| Sulfur (as S) | 5.14 | 4.85 | 5.51 |
| Sulfite (as S) | 0.0328 | 0.0129 | 0.0445 |
| Sulfate (as S) | 1.04 | 0.36 | 1.81 |
| Sulfated Ash | 14.5 | 11.3 | 17.9 |
| Ash | 12.8 | 9.78 | 16.3 |
| Reducing Substances (S/N)* | 33.2 | 16.7 | 42.4 |
| Total Free Sugars | 25.21 | 10.66 | 36.06 |
| Galactose | 3.12 | 1.33 | 4.12 |
| Glucose | 3.80 | 1.67 | 5.19 |
| Mannose | 13.26 | 5.51 | 19.67 |
| Arabinose | 1.14 | 0.53 | 1.39 |
| Xylose | 3.89 | 1.62 | 5.69 |
| Total Sugars (after hydrolysis) | 24.81 | 10.55 | 38.98 |
| Galactose | 2.93 | 1.23 | 4.60 |
| Glucose | 3.96 | 1.65 | 6.07 |
| Mannose | 13.35 | 5.73 | 21.28 |
| Arabinose | 1.00 | 0.40 | 1.39 |
| Xylose | 3.57 | 1.54 | 5.64 |
| Sodium Lignosulfonate | 55.2 | 87.0 | 28.5 |
| Phenolic Hydroxyl | 1.8 | 2.2 | 1.3 |

*Somogyi-Nelson method.

EXAMPLE 2

Diafiltration

Steam-stripped spent sulfite liquor, as described in Example 1, was ultrafiltered using a DDS GS81P membrane (MW cutoff 5,000 daltons). The liquor was pumped through the membrane at 20° C. until the flow rate of the concentrate stream had dropped to 15–25% of the initial rate. The concentrate was diluted with water to its original weight and ultrafiltered again. This process was repeated once more. The final concentrate had 13.36% total solids and contained 0.2% free sugars.

EXAMPLE 3

Removal of sugars and other impurities from spent sulfite liquor (SSL) can lead to improved lignosulfonate products. Ultrafiltration (UF) of SSL readily yields lignosulfonates with significantly decreased sugar levels.

For example, SSL from a dissolving grade pulp with 25.2% free sugars contained only 10.7% after one pass through a 25,000 molecular weight unit (MWU) cutoff Abcor SWM-100 membrane; the sodium lignosulfonate content increased from 55.2% to 87.0%. Using a DDS FS60PP membrane with 30,000 MWU cutoff, this SSL yielded a product that contained up to 92.3% sodium lignosulfonate. A commercial ultrafiltered product which was used in preparation of iron lignosulfonate contained 99.2% sodium lignosulfonate and 1.5% free sugars.

Even purer sodium lignosulfonate has been prepared from spent sulfite liquor by use of the diafiltration (DF) step in accordance with Example 2. This DF process consists of repeated UF passes, interspersed by water dilutions after concentration by UF, on one batch of SSL. This DF procedure and chemical analysis of the resulting liquor are described below.

EXAMPLE 4

The liquor described in Example 2 and used in this DF process consisted of stripped thin liquor from the paper pulp pulping process. The diafiltration was conducted on a DDS Lab 20 UF unit. DDS GS81P membranes with 5,000 MWU cutoff were used and the membranes were cleaned with a 1% Coleo commercial detergent and 1% NaOH solution to maintain flux.

A known weight of 10.5% total solids content paper pulp liquor was passed through the DDS Lab 20 UF unit at 20° C. with an inlet pressure of 8.5 bars and outlet pressure of 7.5 bars. After the concentrate liquor stream flow rate dropped to 15-25% of the initial rate, the run was stopped. The concentrate was diluted with water to the original weight. The second pass through the Lab 20 unit took place under the same conditions. After redilution of this concentrate to the original weight a third pass through the UF unit was carried out. The resulting concentrate contained 13.36% total solids. It analyzed for 0.2% free sugars and 102.4% sodium lignosulfonate (artifact based on test method utilized).

The liquor obtained from the DF procedure has a high degree of purity. The concentrate stream was highly colored while the permeate streams of the three passes were always very light in color, indicating excellent separation. Table IB contains the chemical analyses of both the DF liquor and the original crude SSL. The main features of these analyses include a decrease of free sugar content from 18.7% to 0.2%. At the same time the sodium lignosulfonate content increased from 55.5% to 102.4%. This latter figure is an artifact of the analytical technique. It remains consistent with previous determinations. With such high purity material, improved oil well drilling fluid dispersants are realized.

A second benefit of the highly purified liquor described herein is improved shelf life properties of iron lignosulfonate dispersants. Previous iron materials made from UF treated liquor lose dispersant properties with storage time. Similar iron dispersants derived from higher sodium lignosulfonate content material demonstrated excellent shelf life properties. Their performance after one year of storage nearly equaled their initial characteristics.

TABLE IB

| | Chemical Analyses[a] | |
|---|---|---|
| | Starting SSL | Diafiltered SSL |
| Sodium | 5.3 | 3.6 |
| Methoxyl | 8.2 | 12.6 |
| Sulfur (as S) | 6.0 | 6.1 |
| Sulfite (as S) | 0.01 | 0.20 |
| Sulfate (as S) | 0.84 | 1.06 |
| Ash | 12.8 | 25.8 |
| Reducing Substance (S/N) | 37.0 | 4.9 |
| Total Free Sugars | 18.7 | 0.2 |
| Galactose | 2.4 | 0.0 |
| Glucose | 0.8 | 0.0 |
| Mannose | 10.5 | 0.2 |
| Arabinose | 2.8 | 0.0 |
| Xylose | 2.2 | 0.0 |
| Total Sugars (after hydrolysis) | 22.7 | 0.4 |
| Galactose | 2.6 | 0.0 |
| Glucose | 3.2 | 0.0 |
| Mannose | 12.3 | 0.4 |
| Arabinose | 1.1 | 0.0 |
| Xylose | 3.5 | 0.0 |
| Sodium Lignosulfonate | 55.5 | 102.4 |
| Phenolic Hydroxyl | 1.5 | 2.3 |

[a]% on oven-dry basis

EXAMPLE 5

Iron, titanium and zirconium lignosulfonate drilling mud dispersants have been prepared whose aged mud thinning and gelling properties match those of a particular chromium lignosulfonate, Raykrome-340*, while fluid loss control is significantly improved. The products were prepared from spent sulfite liquor which was subjected to ultrafiltration followed by sulfonation. Using this same starting material, a chromium lignosulfonate with improved thermal stability was prepared. Thermal breakdown of this product was improved by 20°-25° C.

*Trademark of ITT Rayonier, Inc.

Briefly, spent sulfite liquor was fractionated by ultrafiltration; retentate (concentrate) was sulfonated, treated with the appropriate metal salt and the product spray dried. Selected samples were subjected to molecular weight determination by size exclusion-high performance liquid chromatography.

In Table IA as shown on page 7, chemical analyses of the starting, crude sodium-base spent sulfite liquor and the two fractions obtained by ultrafiltration: concentrate and permeate are shown. Similar data for fermented SSL and a control of untreated SSL are shown in Table II below. (p. 16)

Considering the sugar content alone of the fermented and ultrafiltered liquors, the concentrates appear to be similar. However, iron lignosulfonate prepared from ultrafiltered liquor performs much better as a drilling mud dispersant than iron lignosulfonate prepared from fermented liquor. This is a consequence of the fractionation that occurs in ultrafiltration and which does not happen with fermentation. Ultrafiltration removes all low molecular weight material while fermentation only removes fermentable carbohydrates and carbohydrate fragments. (Table II)

The results shown in Tables III and IV with iron lignosulfonate and in Tables VII and VIII with chromium lignosulfonate clearly show the following:

.Sulfonated crude SSL gives a better product than crude SSL.

.Ultrafiltered SSL gives a much poorer product than crude SSL.

.The combination of fermentation and sulfonation provides no improvement over sulfonation alone.

.The combination of ultrafiltration and sulfonation gives a superior product.

.Thermal stability of the chrome lignosulfonate prepared from ultrafiltered-sulfonated SSL was much improved.

Preferred reaction conditions in the preparation of iron lignosulfonate are shown in Table V. The optimum iron content is believed to be 10-12% Fe added as $FeSO_4.nH_2O$. The products prepared with titanium and zirconium compared favorably with chrome lignosulfonate (Table VI). Thermal stabilities of iron lignosulfonate (FeLS), titanium lignosulfonate (TiLS) and chrome lignosulfonate (CrLS) in a fresh water mud are shown in Table IX. Both the iron and titanium lignosulfonates compare well with chrome lignosulfonate.

An aging test was performed on 25% calcium bentonite muds containing iron, titanium and chromium lignosulfonates, wherein the muds were aged for 16 hours at 70° C. after which viscosities were measured in a 90-minute heating cycle to 235° C. at 200 rpm rotor speed on a Fann 50B viscometer. The viscosities of these muds as a function of temperature are shown in FIG. 1. This test shows a breakdown in viscosity properties at 150° C. for the TiLS and CrLS treated muds, while the FeLS treated mud starts to break down at 100° C. These tests indicate that titanium may be the preferred metal in chromeless dispersants.

The results in Tables X and XI indicate that the most preferred products have a molecular weight of around 120,000 with a chain length distribution of less than 2.5 ($\overline{Mw}/\overline{Mn} < 2.5$). This also agrees with the results from ultrafiltered and fermented liquors. Ultrafiltration tends to narrow the chain length distribution while fermentation does not change that distribution. Thus, even if fermented liquor would have a $\overline{Mw} = 120,000$, $\overline{Mw}/\overline{Mn}$ is expected to be greater than 2.5.

FIGS. 2-17 show the molecular weight distribution curves obtained by steric exclusion-high performance liquid chromatography.

Sulfonation

To 600 g of ultrafiltered spent sulfite liquor solids as a 30% solution is added 9.2 ml of 28% ammonia. After mixing thoroughly, 78.6 ml of ammonium bisulfite solution (611 g $SO_2/L = 8\%$ $SO_2$ based on liquor solids) is added. The mixture is placed in an autoclave and heated to 165° C. in 20 minutes. This temperature is maintained for 35 minutes. The solution is cooled and removed from the autoclave, to obtain an intermediate solution which was utilized in the following preparations.

Iron Lignosulfonate

To a sample of sulfonated ultrafiltered intermediate (100 g of solids) was added a solution of 60 g of $FeSO_4.7H_2O$ in 80 ml of water. After cooling in an ice bath, 22.5 ml of 30% $H_2O_2$ was added at a rate that maintained a temperature below 50° C. This mixture was then heated with stirring in a 55° C. water bath for 30 minutes. This reaction mixture was spray dried to yield 138.5 g of iron lignosulfonate.

Titanium Lignosulfonate

To a sample of the sulfonated ultrafiltered intermediate (100 g of solids) was added 16.7 g of $TiOSO_4$. While stirring at room temperature 15.0 ml of 30% hydrogen peroxide was added over a five minute period. This mixture was then heated with stirring in a 55° C. water bath for 30 minutes. This mixture was spray dried to yield 108.5 g of titanium lignosulfonate.

Zirconium Lignosulfonate

To a sample of the sulfonated ultrafiltered intermediate (100 g of solids) was added 19.5 g of $Zr(SO_4)_2.4H_2O$. While stirring at room temperature 11.25 ml of 30% hydrogen peroxide was added over a three minute period. This mixture was then heated with stirring in a 55° C. water bath for 30 minutes. This reaction mixture was spray dried to yield 114.0 g of zirconium lignosulfonate.

Chrome Lignosulfonate

Samples of spent sulfite liquor (crude, ultrafiltered, sulfonated and ultrafiltered-sulfonated) containing 100 g solids each were heated to 50° C. While stirring, a mixture containing 28 ml of 420 g/L sulfuric acid solution and 17 ml of 600 g/L sodium dichromate solution was added slowly. The mixtures were stirred for 30 minutes at 55° C. and then spray dried. Target chromium content of the spray dried products was 3.4%.

Molecular Weight Determination

Chromatographic analysis was performed on a bimodal set of steric exclusion chromatography columns (Waters micro-Bondage, 3.9 mm × 30 cm, E-125 and E-500). These columns cover a nominal molecular weight range from 2,000 to 500,000. The effluent flowrate, 0.5 ml/min, was generated by a Spectra-Physics 8000 liquid chromatograph. A variable wavelength detector (Perkin-Elmer LC-75) was set at 269 nm. Samples diluted to 0.1 to 1.0 g solids/L were injected from a 25 microliter sample loop.

The solvent system used to analyze the samples was prepared by diluting 40 ml of 1.0M phosphoric acid, 60 ml of 1.0M potassium dihydrogen phosphate and 200 ml of acetonitrile to 1000 ml with deionized water. This resulted in a solution that was 20% acetonitrile and 80% pH 2.4 phosphate buffer.

In order to calculate $\overline{Mw}$, the chromatogram was divided into 20 sec time slices for 600 sec beginning at a retention time, (the time the concentrate remains on the column), of 360 sec (retention volume 3.0 ml). Each 20 sec time slice was assigned to a molecular weight based on the retention times of two lignosulfonate standards ($\overline{Mw}=5,300$ and 30,500) and polystyrene sulfonate standards. The $\overline{Mw}$ were calculated according to the following formula:

$$\overline{Mw} = \frac{\sum_{i=1,n} (Area_i \times Mol\ Wt_i^2)}{\sum_{i=1,n} (Area_i \times Mol\ Wt_i)}$$

where
$\overline{Mw}$ = weight average molecular weight
$Area_i$ = area of time slice i
$Mol\ Wt_i$ = molecular weight of time slice i
n = total number of time slices

TABLE II

| CHEMICAL ANALYSIS OF LIQUOR (Reported as % Found on Dry Basis) | | |
| --- | --- | --- |
| | Control | Fermented |
| Sodium | 3.44 | 5.90 |
| Methoxyl | 7.4 | 10.5 |
| Sulfur (as S) | 4.9 | 6.5 |
| Sulfite (as S) | 0.0256 | 0.204 |
| Sulfate (as S) | 0.79 | 1.04 |
| Sulfated Ash | 13.3 | 19.2 |
| Ash | 12.0 | 17.1 |
| Reducing Substances (S/N) | 33.5 | 13.6 |
| Total Free Sugars | 25.79 | 5.60 |

TABLE II-continued

CHEMICAL ANALYSIS OF LIQUOR
(Reported as % Found on Dry Basis)

| | Control | Fermented |
|---|---|---|
| Galactose | 3.34 | 0.22 |
| Glucose | 3.78 | 0.00 |
| Mannose | 13.42 | 0.00 |
| Arabinose | 1.23 | 1.39 |
| Xylose | 4.02 | 3.99 |
| Total Sugars (after Hydrolysis) | 25.14 | 8.55 |
| Galactose | 3.15 | 0.55 |
| Glucose | 3.92 | 0.95 |
| Mannose | 13.50 | 2.16 |
| Arabinose | 1.10 | 1.22 |
| Xylose | 3.47 | 3.67 |
| Sodium Lignosulfonate | 55.6 | 70.4 |
| Phenolic Hydroxyl | 1.8 | 2.2 |

In Tables III–IX, the following abbreviations are used:
SSL Unmodified, crude spent sulfite liquor
SUL Sulfonated SSL
FER Fermented SSL
UF Ultrafiltered SSL
CrLS Chrome lignosulfonate
FeLS Iron lignosulfonate
TiLS Titanium lignosulfonate
ZrLS Zirconium lignosulfonate
AV Apparent viscosity (cps)
PV Plastic viscosity (cps)
YV Yield value (lb/100 ft$^2$)
FL Fluid loss (ml/30 min)

All test results are in contaminated muds; 25% mud contains 2 lb/barrel of sodium chloride and 3 lb/barrel gypsum; 28% mud contains 1.75 lb/barrel sodium chloride. Unless otherwise specified, test results are in 25% calcium bentonite after 70° C. aging.

TABLE III

Effect of Purification/Sulfonation of SSL on Performance of Iron Lignosulfonates

| | SUL | UF | UF/SUL | FER/SUL | CrLS(control) |
|---|---|---|---|---|---|
| AV | 23.5 | 43.5 | 15.5 | 25.5 | 14.5 |
| PV | 10 | 14 | 11 | 12 | 11 |
| YV | 27 | 59 | 9 | 27 | 7 |
| FL | 27.8 | 24.0 | 21.8 | 26.6 | 28.0 |

TABLE IV

Effect of Ultrafiltration/Sulfonation of SSL on Performance of Iron Lignosulfonates in 28% Calcium Bentonite After 70° C. Aging

| | SSL | SUL | UF | UF/SUL |
|---|---|---|---|---|
| AV | 52.5 | 51.5 | 60 | 25 |
| PV | 18 | 18 | 29 | 21 |
| YV | 69 | 67 | 62 | 8 |
| FL | 24.3 | 22.7 | 17.7 | 19.4 |

TABLE V

Effect of Metal Content on Performance of Iron Lignosulfonates

| | 6[a] | 8 | 10 | 12 | 14 |
|---|---|---|---|---|---|
| AV | 16 | 15.5 | 15 | 14.5 | 15 |
| PV | 12 | 13 | 13 | 13 | 12 |
| YV | 8 | 5 | 4 | 3 | 6 |
| FL | 23.6 | 24.8 | 25.8 | 27.7 | 29.6 |

[a]% Fe as FeSO$_4$.nH$_2$O added to sulfonated SSL (solids basis).

TABLE VI

Comparison of Chromeless Dispersants with Chrome Lignosulfonate

| | CrLS | TiLS | CrLS | FeLS | CrLS | ZrLS |
|---|---|---|---|---|---|---|
| AV | 16 | 18.5 | 14.5 | 15.5 | 18 | 19 |
| PV | 12 | 14 | 11 | 11 | 12 | 14 |
| YV | 9 | 9 | 7 | 9 | 11 | 10 |
| FL | 27.3 | 11.5 | 28.0 | 21.8 | 27.4 | 20.0 |

TABLE VII

Effect of Ultrafiltration/Sulfonation of SSL on Performance of Chrome Lignosulfonates in 28% Calcium Bentonite after 70° C. Aging

| | SSL | SUL | UF | UF/SUL |
|---|---|---|---|---|
| AV | 42.5 | 30 | 79 | 21.5 |
| PV | 21 | 20 | 31 | 21 |
| YV | 43 | 20 | 96 | 1 |
| FL | 17.0 | 20.4 | 17.0 | 19.2 |

TABLE VIII

Thermal Stability of Chrome Lignosulfonates in 28% Calcium Bentonite After 150° C. Aging

| | SSL | SUL | UF | UF/SUL |
|---|---|---|---|---|
| AV | 64 | 59.5 | 74 | 43 |
| PV | 21 | 19 | 30 | 23 |
| YV | 76 | 81 | 88 | 40 |
| FL | 21.6 | 27.6 | 28.4 | 26.9 |

TABLE IX

Thermal Stability of Iron, Titanium and Chromium Lignosulfonates in 25% Calcium Bentonite After 150° C. Aging

| | CrLS | FeLS | TiLS |
|---|---|---|---|
| AV | 34 | 35.5 | 37.5 |
| PV | 11 | 12 | 11 |
| YV | 46 | 47 | 53 |
| FL | 32.2 | 32.4 | 26.0 |

TABLE X

Molecular Weight Correlation With Retention Time

| Retention Time (sec.) | Calculated Molecular Weight[a] |
|---|---|
| 419 | 474,000 |
| 439 | 323,000 |
| 459 | 220,000 |
| 479 | 150,000 |
| 499 | 102,000 |
| 519 | 70,000 |
| 539 | 47,000 |
| 559 | 32,000 |
| 579 | 22,000 |
| 599 | 15,000 |
| 619 | 10,000 |
| 639 | 6,900 |
| 659 | 4,700 |
| 679 | 3,200 |
| 699 | 2,200 |
| 719 | 1,400 |
| 739 | 1,000 |

[a]Based on NaLS standard of 30,500 and 5,300 weight average molecular weight with retention times of 582 and 648 sec. respectively and a slope based on polystyrene standards.

TABLE XI

Molecular weights of Liquors and Dispersants

Figure 2:
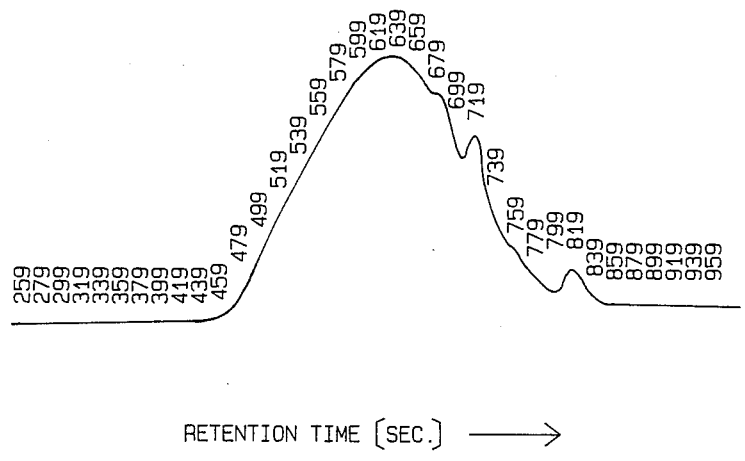
FIGS. 2-17 are graphs illustrating the molecular weight distribution of lignosulfonates as described in the graphs.
Figure 3:
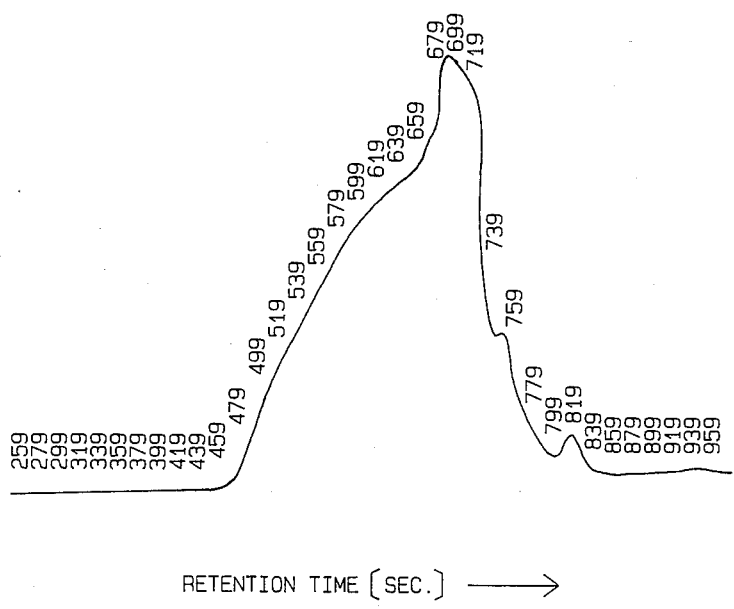
Figure 4:
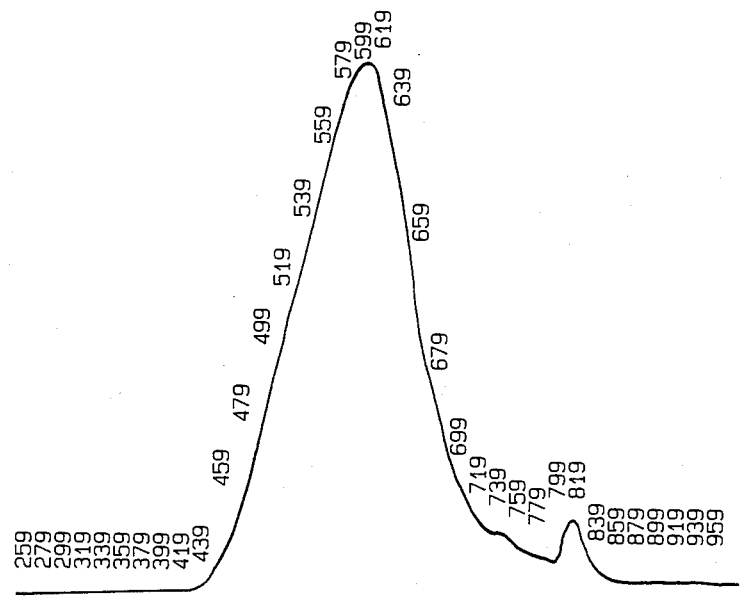
Figure 5:
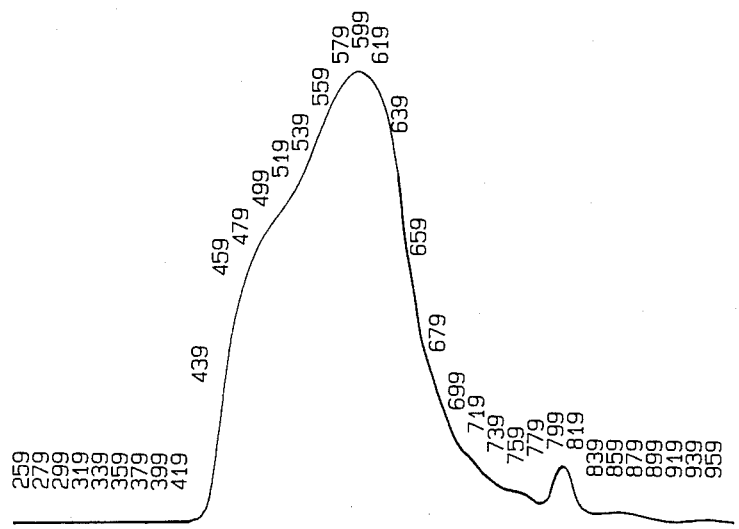

| Liquor Type | Crude Liquor | Sulfonated Liquor | Ultra-filtered Liquor | Sulfonated/Ultrafiltered Liquor |
|---|---|---|---|---|
| Dispersant type | FIG. 2 | FIG. 3 | FIG. 4 | FIG. 5 |
| Lignosulfonate | 47,900 | 46,900 | 54,200 | 88,400 |

TABLE XI-continued

Figure 6:
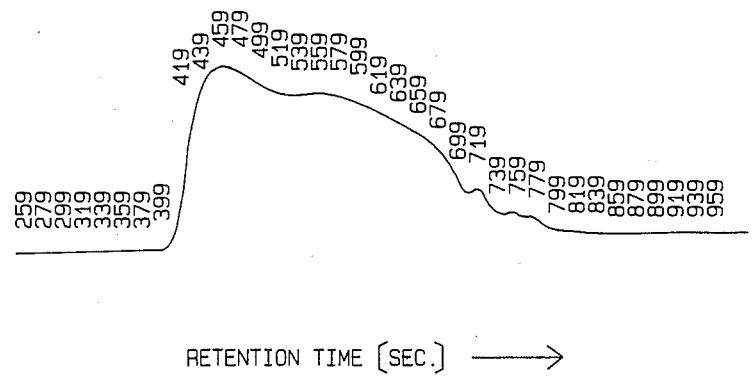
Figure 7:
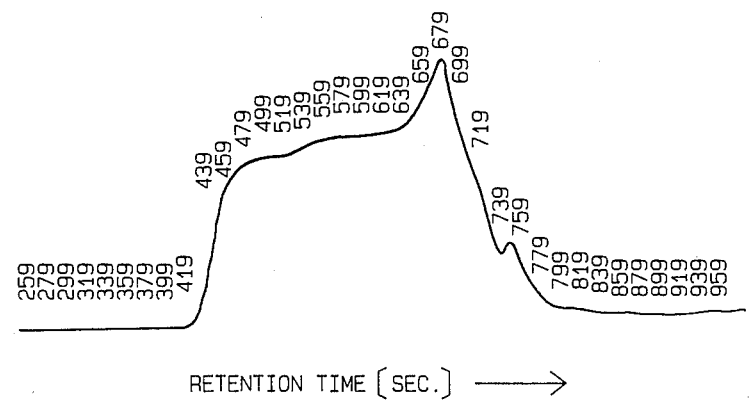
Figure 8:
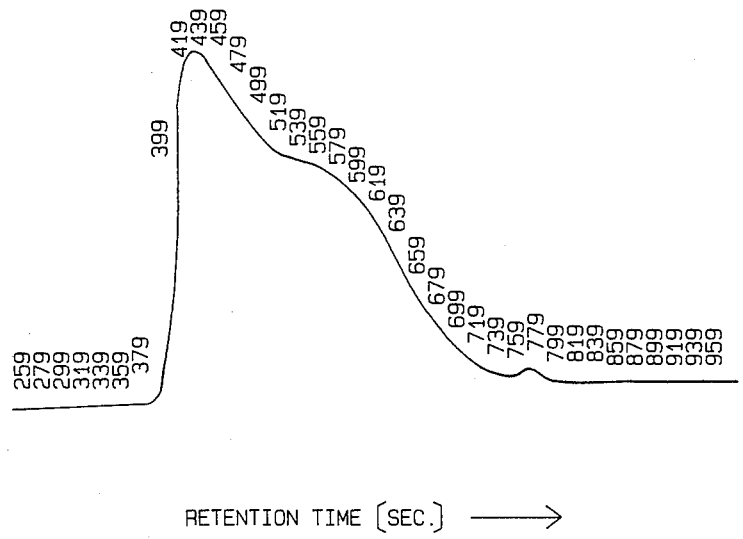
Figure 9:
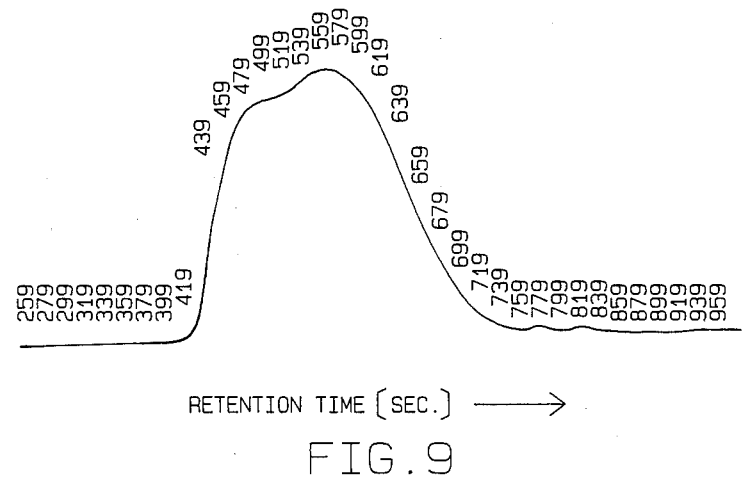
Figure 10:
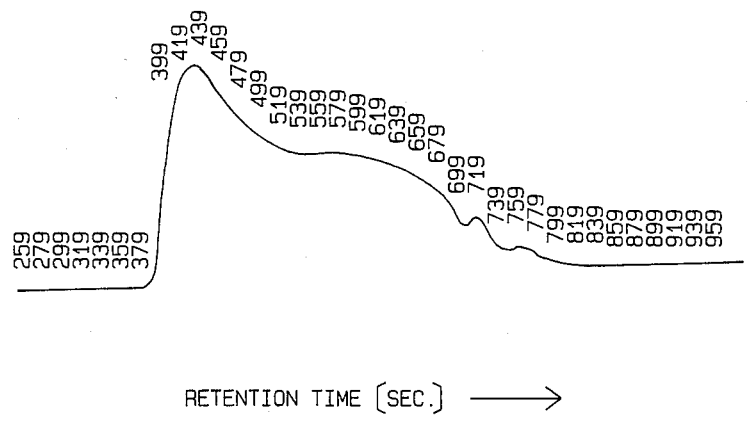
Figure 11:
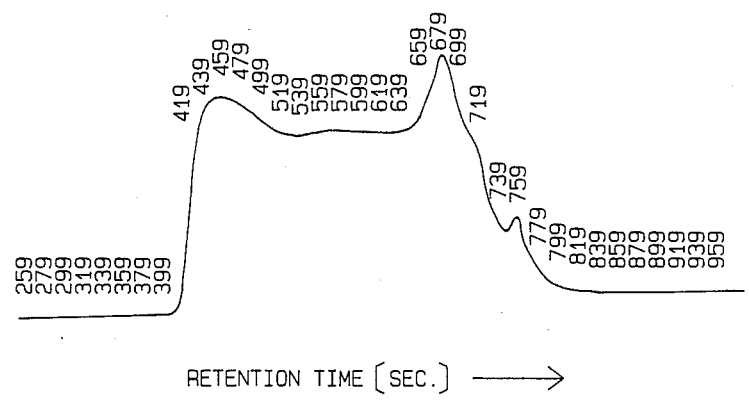
Figure 12:
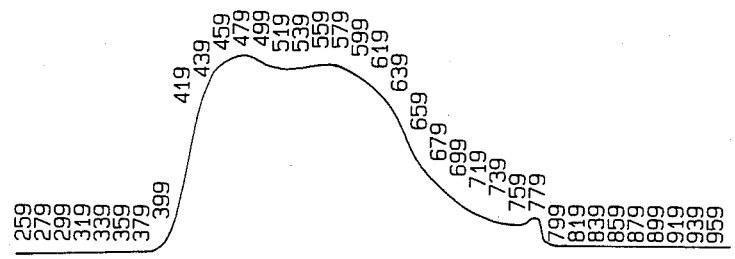
Figure 13:
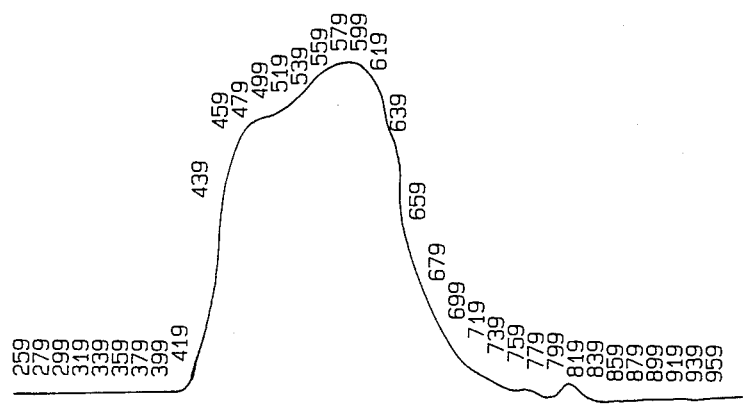
Figure 14:
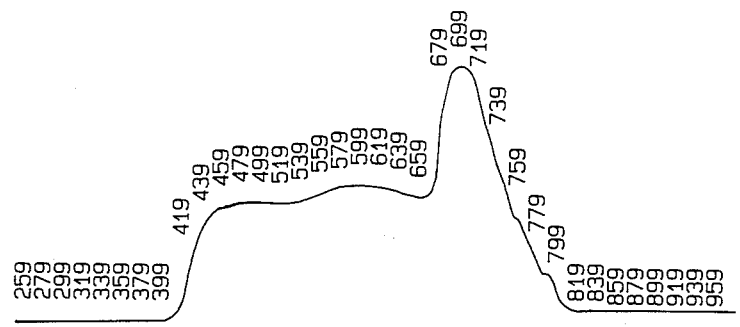
Figure 15:
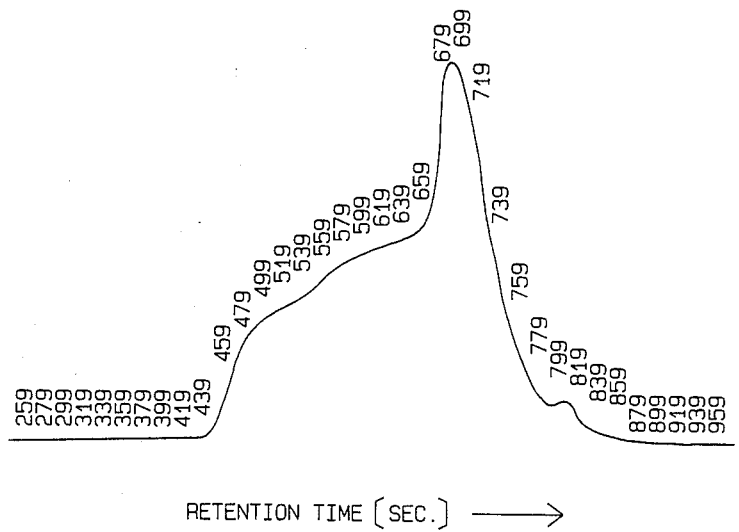
Figure 16:
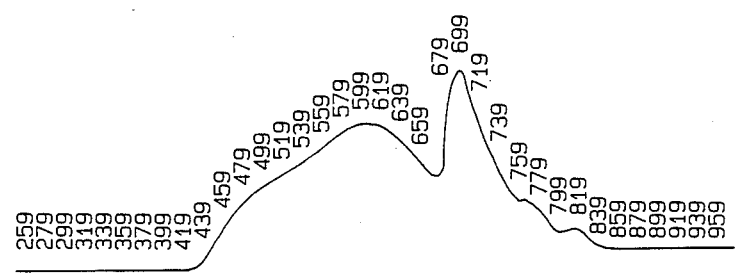
Figure 17:
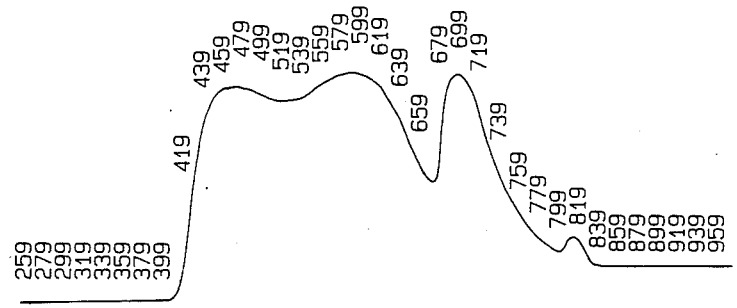

| | Molecular weights of Liquors and Dispersants | | | |
|---|---|---|---|---|
| Liquor Type | Crude Liquor | Sulfonated Liquor | Ultra-filtered Liquor | Sulfonated/ Ultrafiltered Liquor |
| | 13,100 | 12,400 | 20,200 | 33,500 |
| | 3.7 | 3.8 | 2.7 | 2.6 |
| CrLS | FIG. 6 | FIG. 7 | FIG. 8 | FIG. 9 |
| 4% Cr | 185,000 | 116,000 | 290,000 | 121,000 |
| | 69,700 | 35,100 | 125,000 | 48,800 |
| | 2.7 | 3.3 | 2.3 | 2.5 |
| CrLS | FIG. 10 | FIG. 11 | FIG. 12 | FIG. 13 |
| 3.5% Cr | 278,000 | 189,000 | 199,000 | 117,000 |
| | 109,000 | 60,400 | 75,900 | 46,000 |
| | 2.6 | 3.1 | 2.6 | 2.5 |
| FeLS | FIG. 14 | FIG. 15 | FIG. 16 | FIG. 17 |
| | 165,000 | 82,800 | 92,300 | 155,000 |
| | 34,800 | 18,800 | 20,900 | 45,600 |
| | 4.7 | 4.4 | 4.4 | 3.4 |

For each sample the data are as follows:
Figure Number for molecular weight distribution curve; Weight average molecular weight (Mw); Number average molecular weight (Mn); and Mw/Mn.

EXAMPLE 6

Using lower total solids in the ultrafiltered lignosulfonate solution eliminates gel formation in the sulfonation step. Adding the ferric sulfate as a solid directly to the sulfonated liquor requires less handling. The materials made with these techniques maintain the excellent performance of previously developed iron lignosulfonates.

Iron lignosulfonate ["Fe(III)LS", from ferric sulfate] oil well drilling fluid dispersants were prepared successfully from a commercial ultrafiltered lignosulfonate. Because of potential corrosion problems, additional Fe(III)LS dispersants were evaluated which had been partially neutralized prior to spray drying. The pH adjusted materials gave acceptable dispersant performance albeit not at the high quality of unneutralized Fe(III)LS.

The modified techniques for making Fe(III)LS dispersants are described in Example 3. The sulfonation step was changed by using 30% total solids UF liquor rather than 35% total solids, and 100 to 150 psi steam for heating. The hydrogen peroxide ($H_2O_2$) and ferric sulfate [$Fe_2(SO_4)_3 \cdot nH_2O$ where the water content approaches 26%] oxidation was done by two methods. The first used a ferric sulfate solution while the second used solid $Fe_2(SO_4)_3 \cdot nH_2O$. The solid spray dried Fe(III)LS dispersants were evaluated in the standard mud test with 70° C. aging.

Dispersants originating from 30% total solids UF lignosulfonates were utilized in the standard mud test with 70° C. aging. The results of the test for several of these dispersants are listed in Table XII. This table compares both unadjusted pH Fe(III)LS and adjusted pH dispersants derived from two separate sulfonated liquors at 30% total solids. Some unexplained variation exists with the unadjusted pH dispersant. However, excellent performance results from Fe(III)LS made from 30% total solids liquor. The data for additional pH adjusted Fe(III)LS show even better performance for the partially neutralized materials occuring when ammonia is added after the $H_2O_2$ reaction. This observation coincides with that noted when higher solids levels are used to prepare Fe(III)LS dispersants. Table XIII contains the contaminated mud test data with 150° C. aging for the dispersants made from two sulfonated liquors. The apparent difference in the unadjusted pH dispersants, seen in the standard 70° C. mud test, was not seen in this test. This contaminated system also yields similar results for both the pH adjusted and unadjusted dispersants.

Adding ferric sulfate as a solid to these 30% total solids high purity liquors results in excellent Fe(III)LS dispersants. In Table XIV are listed standard mud test data for unadjusted pH materials and three partially neutralized dispersants. The data show excellent performance levels with the unadjusted pH Fe(III)LS. The partially neutralized dispersants show no effect from ammonia addition after the reaction at 25° C. or 55° C. Improved dispersant performance was obtained with the Fe(III)LS that was adjusted to pH 1.7 prior to spray drying. Contaminated mud test data for these same four dispersants are shown in Table IV. In this test slightly better performance may be evident for the adjusted pH dispersants. No performance advantage was observed in adding ferric sulfate as a solution rather than as a solid.

As above, 30% total solids high purity lignosulfonate solution and solid ferric sulfate was prepared and sufficient ammonia was added to adjust the Fe(III)LS solution to pH 1.7 prior to spray drying to prepare the Fe(III)LS dispersants. Additional Fe(III)LS dispersants, both with unadjusted and adjusted pH, were made under these conditions for corrosion studies. Standard mud test data for both these dispersants are listed in Table XVI. Each sample performed at an excellent level in this test. With these repeated preparations the performance levels equaled those of the earlier samples shown in Table XIV.

Part A

Preparation of Sulfonated Intermediate from 30% Total Solids UF Liquor

To 2000 g of a 30% total solids solution of UF liquor was added 9.2 ml of 28% ammonia. After mixing, 78.6 ml of ammonium bisulfite solution (611 g $SO_2$/L; 8% $SO_2$ based on liquor solids) was added. This mixture was placed in an autoclave, heated to 165° C. and maintained at that temperature for 35 minutes.

Part B

Preparation of partially Neutralized Fe(III)LS

To a 166.5 g sample of sulfonated intermediate was added 21.7 g of $FE_2(SO_4)_3 \cdot nH_2O$ (where $H_2O$ content was ~26% by weight). This was stirred at room temperature for 25 minutes to dissolve the ferric sulfate. To this mixture was added 4.5 ml of 30% $H_2O_2$ keeping the temperature below 55° C. This mixture was heated with stirring in a 55° C. water bath for 30 minutes. The cooled mixture was diluted with 15 ml $H_2O$ and partially neutralized with 5.5 ml of 28% ammonia. The final pH was 1.7. This solution was spray dried to yield 66 g of solid Fe(III)LS.

TABLE XII

Performance of Ferric Sulfate Solution Derived Fe(III)LS in Standard CrLS Mud Test with 70° C. Aging

| State of Ferric Sulfate Neutralization Conditions | Solution | Solution | Solution | Solution | Solution | Solution |
|---|---|---|---|---|---|---|
| Ammonia (g/100 g of Intermed. Solids) | None | 3.8 | None | 3.8 | 3.8 | 3.8 |

TABLE XII-continued

Performance of Ferric Sulfate Solution Derived Fe(III)LS in Standard CrLS Mud Test with 70° C. Aging

| Where Ammonia Added | — | After H$_2$O$_2$ | — | After H$_2$O$_2$ | Added to Intermed. | Added to Fe$_2$(SO$_4$)$_3$ |
|---|---|---|---|---|---|---|
| Temperature at Addition | — | 25 | — | 25 | Room Temp. | Room Temp. |
| Final pH | 0.8 | 2.0 | 0.7 | 1.9 | 2.5 | 2.3 |
| Unaged | | | | | | |
| pH | 9.6/9.6 | 9.6/9.6 | 9.6/9.6 | 9.6/9.6 | 9.6/9.6 | 9.6/9.6 |
| Apparent viscosity (cps) | 30.5/36 | 28.5/35 | 32.5/35 | 27.5/35 | 29.5/35 | 29.5/35 |
| Plastic viscosity (cps) | 26/25 | 25/24 | 27/24 | 24/24 | 24/24 | 25/24 |
| Yield value (lb/100 ft$^2$) | 9/22 | 7/22 | 11/22 | 7/22 | 11/22 | 9/22 |
| Aged at 70° C. for 16 hours | | | | | | |
| Aged pH | 8.7/8.2 | 8.8/8.2 | 8.6/8.2 | 8.9/8.2 | 8.8/8.2 | 8.8/8.2 |
| Adjusted pH | 9.6/9.6 | 9.5/9.5 | 9.6/9.5 | 9.6/9.5 | 9.5/9.5 | 9.6/9.5 |
| Apparent viscosity (cps) | 33.5/33 | 31.5/32 | 29/32 | 31/32 | 35/32 | 37/32 |
| Plastic viscosity (cps) | 23/22 | 22/22 | 22/22 | 22/22 | 20/22 | 21/22 |
| Yield value (lb/100 ft$^2$) | 21/20 | 19/20 | 14/20 | 18/20 | 30/20 | 32/20 |
| 10 sec gel (lb/100 ft$^2$) | 20/18 | 20/18 | 12/18 | 19/18 | 25/18 | 27/18 |
| 10 min gel (lb/100 ft$^2$) | 35/34 | 32/34 | 32/34 | 33/34 | 30/34 | 28/34 |
| Fluid loss (ml/30 min) | 21.7/22.4 | 20.7/22.1 | 19.8/22.1 | 21.3/22.1 | 21.0/22.1 | 21.2/22.1 |

$^a$These data are represented as follows: Data for sample/data for CrLs standard (4% Cr)

TABLE XIII

Performance of Ferric Sulfate Solution Derived Fe(III)LS in Contaminated CrLS Mud Test with 150° C. Aging

| State of Ferric Sulfate Neutralization Conditions | Solution | Solution | Solution | Solution |
|---|---|---|---|---|
| Ammonia (g/100 g of Intermed. Solids) | None | 3.8 | None | 3.8 |
| Where Ammonia Added | — | After H$_2$O$_2$ | — | After H$_2$O$_2$ |
| Temperature at Addition (°C.) | — | 25 | — | 25 |
| Final pH | 0.8 | 2.0 | 0.7 | 1.9 |
| Unaged | | | | |
| pH | 9.6/9.5 | 9.6/9.5 | 9.6/9.5 | 9.6/9.5 |
| Apparent viscosity (cps) | 32.5/45 | 30.5/45 | 36/45 | 32/45 |
| Plastic viscosity (cps) | 30/30 | 29/30 | 33/30 | 31/30 |
| Yield value (lb/100 ft$^2$) | 5/28 | 3/28 | 6/28 | 2/28 |
| Aged at 150° C. for 16 hours | | | | |
| Aged pH | 6.6/6.3 | 6.8/6.3 | 6.6/6.3 | 7.0/6.3 |
| Apparent viscosity (cps) | 66.5/56 | 66/56 | 66/56 | 67.5/66 |
| Plastic viscosity (cps) | 21/21 | 21/21 | 20/21 | 22/21 |
| Yield value (lb/100 ft$^2$) | 91/70 | 88/70 | 92/70 | 93/70 |
| 10 sec gel (lb/100 ft$^2$) | 60/42 | 59/42 | 62/42 | 61/42 |
| 10 min gel (lb/100 ft$^2$) | 59/45 | 60/45 | 62/45 | 56/45 |
| Fluid loss (ml/30 min) | 26.8/28.7 | 25.2/28.7 | 26.4/28.7 | 24.6/28.7 |

$^a$These data are represented as follows: Data for sample/data for CrLs standard (4% Cr).

TABLE XIV

Performance of Solid Ferric Sulfate Derived Fe(III)LS in Standard CrLS Mud Test with 70° C. Aging

| Stage of Ferric Sulfate Neutralization Conditions | Solid | Solid | Solid | Solid |
|---|---|---|---|---|
| Ammonia (g/100 go Intermed. Solids) | None | 3.8 | 3.8 | 2.8 |
| Where Ammonia Added | — | After H$_2$O$_2$ | After H$_2$O$_2$ | After H$_2$O$_2$ |
| Temperature at Addition (°C.) | — | 55 | 25 | 25 |
| Final pH | 0.5 | 1.9 | 1.9 | 1.7 |
| Unaged | | | | |
| pH | 9.6/9.6 | 9.6/9.6 | 9.6/9.6 | 9.6/9.6 |
| Apparent viscosity (cps) | 32/36 | 30/36 | 30/36 | 29/36 |
| Plastic viscosity (cps) | 27/25 | 25/25 | 25/25 | 25/25 |
| Yield value (lb/100 ft$^2$) | 10/22 | 10/22 | 10/22 | 8/22 |
| Aged at 70° C. for 16 hours | | | | |
| Aged pH | 8.6/8.2 | 8.8/8.2 | 8.8/8.2 | 8.8/8.2 |
| Adjusted pH | 9.7/9.6 | 9.6/9.6 | 9.6/9.6 | 9.6/9.6 |
| Apparent viscosity (cps) | 31/33 | 32.5/33 | 34/33 | 31.5/33 |
| Plastic viscosity (cps) | 24/22 | 22/22 | 24/22 | 22/22 |
| Yield value (lb/100 ft$^2$) | 14/20 | 21/20 | 20/20 | 19/20 |
| 10 sec gel (lb/100 ft$^2$) | 15/18 | 20/18 | 21/18 | 18/18 |
| 10 min gel (lb/100 ft$^2$) | 33/34 | 25/34 | 33/34 | 29/34 |
| Fluid loss (ml/30 min) | 20.9/22.4 | 20.6/22.4 | 20.5/22.4 | 20.6/22.4 |

$^a$These data are represented as follows: Data for sample/data for CrLs standard (4% Cr)

TABLE XV

Performance of Solid Ferric Sulfate Derived Fe(III)LS in contaminated CrLS Mud Test with 150° C. Aging

| State of Ferric Sulfate Neutralization Conditions | Solid | Solid | Solid | Solid |
|---|---|---|---|---|
| Ammonia (g/100 g of Intermed. Solids) | None | 3.8 | 3.8 | 2.8 |
| Where Ammonia Added | — | After $H_2O_2$ | After $H_2O_2$ | After $H_2O_2$ |
| Temperature at Addition (°C.) | — | 55 | 25 | 25 |
| Final pH | 0.5 | 1.9 | 1.9 | 1.7 |
| *Unaged* | | | | |
| pH | 9.5/9.5 | 9.6/9.5 | 9.6/9.5 | 9.5/9.5 |
| Apparent viscosity (cps) | 39.5/47 | 33.5/47 | 33.5/47 | 32.5/47 |
| Plastic viscosity (cps) | 36/33 | 32/33 | 31/33 | 31/33 |
| Yield value (lb/100 ft$^2$) | 7/28 | 3/28 | 5/28 | 3/28 |
| *Aged at 150° C. for 16 hours* | | | | |
| Aged pH | 6.5/6.3 | 6.8/6.3 | 6.8/6.3 | 6.8/6.3 |
| Apparent viscosity (cps) | 69.5/57.5 | 67/57.5 | 66.5/57.5 | 66.5/57.5 |
| Plastic viscosity (cps) | 20/22 | 24/22 | 22/22 | 22/22 |
| Yield value (lb/100 ft$^2$) | 99/72 | 86/72 | 89/72 | 89/72 |
| 10 sec gel (lb/100 ft$^2$) | 63/46 | 58/46 | 61/46 | 61/46 |
| 10 min gel (lb/100 ft$^2$) | 61/46 | 59/46 | 57/46 | 58/46 |
| Fluid loss (ml/30 min) | 25.7/28.1 | 24.6/28.1 | 24.6/28.1 | 24.8/28.1 |

*These data are represented as follows: Data for sample/data for CrLS standard (4% Cr).

TABLE XVI

Performance of Corrosion Samples of Fe(III)LS in Standard CrLS Mud Test with 70° C. Aging

| State of Ferric Sulfate Neutralization Conditions | Solid | Solid |
|---|---|---|
| Ammonia (g/100 g of Intermed. Solids) | None | 2.8 |
| Where Ammonia Added | — | After $H_2O_2$ |
| Temperature at Addition (°C.) | — | 25 |
| Final pH | 0.8 | 1.7 |
| *Unaged* | | |
| pH | 9.6/9.6 | 9.5/9.6 |
| Apparent viscosity (cps) | 34.5/41 | 33.5/41 |
| Plastic viscosity (cps) | 29/26 | 29/26 |
| Yield value (lb/100 ft$^2$) | 11/30 | 9/30 |
| *Aged at 70° C. for 16 hours* | | |
| Aged pH | 8.6/8.2 | 8.7/8.2 |
| Adjusted pH | 9.5/9.5 | 9.6/9.5 |
| Apparent viscosity (cps) | 33.5/36 | 34.5/36 |
| Plastic viscosity (cps) | 24/23 | 25/23 |
| Yield value (lb/100 ft$^2$) | 19/26 | 19/26 |
| 10 sec gel (lb/100 ft$^2$) | 17/22 | 20/22 |
| 10 min gel (lb/100 ft$^2$) | 37/39 | 38/39 |

*These data are represented as follows: Data for sample/data for CrLS standard (4% Cr).

EXAMPLE 7

Oil well drilling fluid dispersant iron lignosulfonates were made from ultrafiltered liquor solids by the reaction of ferric sulfate and hydrogen peroxide with the sulfonated liquor. At a 9% iron level the best dispersant performance resulted with hydrogen peroxide levels varying from 2 to 4%. The performance in both standard and contaminated mud tests equaled that of previously made iron lignosulfonates.

The commercial UF lignosulfonate derived Fe(III)LS dispersants were made by techniques similar to those described for ultrafiltered liquors described in Example 3. The sodium lignosulfonate solutions were prepared from UF liquor solids that were previously studied and analyzed. This liquor solution was sulfonated at 8% $SO_2$ (as $NH_4HSO_3$) levels with either 0.90% or 0.38% ammonia added. An example of the 0.90% ammonia, 8.0% $SO_2$ sulfonation is shown below. The preparation of the Fe(III)LS used 9.0% Fe and $H_2O_2$ levels varying from 2.0 to 4.0%. The iron source was ferric sulfate [$Fe_2(SO_4)_3 \cdot nH_2O$ with a water content approaching 26%]. An example of the Fe(II)LS preparation at 9% Fe and 3.0% $H_2O_2$ is given below.

These Fe(III)LS products were evaluated in two mud systems. The first was the standard mud aged at 70° C. for 16 hours. The second was the contaminated mud aged at 150° C. for 16 hours as previously described.

Reaction of UF lignosulfonates with ferric sulfate and $H_2O_2$ gives Fe(III)LS which has excellent dispersant performance. Table XVII compares the performance of a Fe(III)LS dispersant in two different mud tests. The dispersant properties of this material were significantly better than the chromium containing standard in the mud test with 70° C. aging for 16 hours. This same Fe(III)LS was at an acceptable level in the contaminated mud aged at 150° C. when compared to the chromium standard. The performance in this high temperature contaminated mud was similar to those of previously made Fe(III)LS and Fe(II)LS dispersants.

Table XVIII contains performance data for additional Fe(III)LS materials made from two different sulfonated intermediates. These samples were made at 9% Fe using $H_2O_2$ levels varying from 2.0 to 3.0%. FIGS. XIX and XX illustrate the preparation of these Fe(III)LS dispersants according to a procedure described earlier. These data show that the minimum $H_2O_2$ level should be 3.0% at the 9% Fe level. Also, when the sulfonated intermediate has the lower pH of 4.8 the dispersant performance deteriorates less at the lower $H_2O_2$ levels.

Part A

Example of the Preparation of Sulfonated Intermediate (8% $SO_2$)

To 1540 g of UF liquor (35.71% total solids) was added 20.5 ml of 28% ammonia. The mixture was stirred a few minutes and 72.4 ml of ammonium bisulfate solution (608 g $SO_2$/L) was added. After stirring for five minutes the mixture was placed in an autoclave. The autoclave was sealed and heated to 165° C. in 20 minutes and then maintained at 165° C. for 35 minutes. The contents were cooled before removal from the autoclave.

Part B

Example of the Preparation of Iron Lignosulfonate

To a 100 g liquor solids sample of (8% $SO_2$) sulfonated intermediate was added a solution of 43.4 g $Fe_2(SO_4)_3 \cdot nH_2O$ in 60 ml of water. To this solution at 35° C., 9.0 ml of 30% $H_2O_2$ was added in 25 seconds. After this addition the temperature rose to 49° C. This mixture was then heated with stirring in a 55° C. water bath for 30 minutes. After cooling this solution was spray dried to yield 137.0 g of Fe(III)LS.

TABLE XVII

Mud Tests of Fe(III)LS Dispersant Derived from commercial UF Liquor

| | | |
|---|---|---|
| Fe (g/100 g of intermed. solids) | 9.0 | 9.0 |
| $H_2O_2$ (g/100 g of intermed. solids) | 3.75 | 3.75 |
| Intermed. pH | 6.2 | 6.2 |
| Mud Test | Standard | Contaminated |

TABLE XVII-continued

Mud Tests of Fe(III)LS Dispersant Derived from commercial UF Liquor

| Aging Temperature | 70° C. | 150° C. |
|---|---|---|
| Unaged | | |
| pH | 9.6/9.5 | 9.5/9.5 |
| Apparent viscosity (cps) | 29.5/38 | 33.5/47 |
| Plastic viscosity (cps) | 26/24 | 32/31 |
| Yield value (lb/100 ft$^2$) | 7/27 | 3/32 |
| Aged at 70° C. for 16 hours | | |
| Aged pH | 8.5/8.2 | 6.6/6.4 |
| Adjusted pH | 9.6/9.4 | NA$^b$ |
| Apparent viscosity (cps) | 29/34 | 69/59 |
| Plastic viscosity (cps) | 23/22 | 23/22 |
| Yield value (lb/100 ft$^2$) | 12/25 | 92/75 |
| 10 sec gel (lb/100 ft$^2$) | 13/21 | 60/46 |
| 10 min gel (lb/100 ft$^2$) | 30/33 | 62/48 |
| Fluid loss (ml/30 min) | 20.5/21.4 | 27.3/27.8 |

$^a$The data are presented as follows: data for sample/data for Standard
$^b$Aged mud tested at unadjusted pH

TABLE XVIII (4% Cr) Fe(III)LS Performance in the CrLs Mud Test Aged at 70° C.$^a$

| | | | | | | |
|---|---|---|---|---|---|---|
| Fe (g/100 g of intermed. solids) | 9.0 | 9.0 | 9.0 | 9.0 | 9.0 | 9.0 |
| H$_2$O$_2$ (g/100 g of intermed. solids) | 4.0 | 3.0 | 2.0 | 4.0 | 3.0 | 2.0 |
| Intermed. pH | 4.8 | 4.8 | 4.8 | 6.2 | 6.2 | 6.2 |
| Unaged | | | | | | |
| pH | 9.5/9.6 | 9.5/9.6 | 9.5/9.6 | 9.6/9.6 | 9.6/9.6 | 9.6/9.6 |
| Apparent viscosity (cps) | 32/33 | 28/33 | 25.5/33 | 28/33 | 24.5/33 | 24.5/33 |
| Plastic viscosity (cps) | 26/22 | 24/22 | 22/22 | 24/22 | 23/22 | 21/22 |
| Yield value (lb/100 ft$^2$) | 12/20 | 8/20 | 7/20 | 8/20 | 3/20 | 7/20 |
| Aged at 70° C. for 16 hours | | | | | | |
| Aged pH | 8.5/8.2 | 8.6/8.2 | 8.6/8.2 | 8.6/8.2 | 8.7/8.2 | 8.7/8.2 |
| Adjusted pH | 9.6/9.5 | 9.6/9.5 | 9.6/9.5 | 9.6/9.5 | 9.5/9.5 | 9.5/9.5 |
| Apparent viscosity (cps) | 26/30 | 26.5/30 | 29.5/30 | 26/30 | 27.5/30 | 32/30 |
| Plastic viscosity (cps) | 22/21 | 22/21 | 20/21 | 21/21 | 20/21 | 20/21 |
| Yield value (lb/100 ft$^2$) | 8/18 | 9/18 | 19/18 | 10/18 | 15/18 | 24/18 |
| 10 sec gel (lb/100 ft$^2$) | 8/16 | 11/16 | 19/16 | 9/16 | 13/16 | 22/16 |
| 10 min gel (lb/100 ft$^2$) | 21/32 | 26/32 | 37/32 | 23/32 | 28/32 | 39/32 |
| Fluid loss (ml/30 min) | 19.1/22.4 | 20.2/22.4 | 21.0/22.4 | 20.7/22.4 | 21.3/22.4 | 21.8/22.4 |

$^a$The data are presented as follows: data for sample/data for CrLs Standard (4% Cr).

EXAMPLE 8

Improved iron lignosulfonate (FeLS) oil well drilling fluid dispersants were made from sodium-base spent sulfite liquor which was ultrafiltered using an Abcor, Inc. SWM-100 membrane. The performance of these FeLS dispersants improved with increasing iron content. Preferred dispersants were made with 12 g of iron per 100 g of sulfonated ultrafiltered liquor solids. This dispersant matched or exceeded the performance of existing chromium based dispersants in all mud tests except high temperature aging in a contaminated mud system. However, the performance in this test closely matched the acceptable level for existing dispersants.

The FeLS dispersants used in this example were prepared from sulfonated UF liquor. The liquor was ultrafiltered using an Abcor SWM-100 membrane which has a molecular weight cutoff of approximately 25,000. The liquor was sulfonated with 8% SO$_2$. The details of the reaction of ferrous sulfate and hydrogen peroxide (H$_2$O$_2$) with these modified liquors are also shown.

The resultant FeLS dispersants were tested in several mud systems. A test using 25% calcium bentonite was used for initial screening of the FeLS dispersants. The FeLS samples were further evaluated using a standard mud test in 28% calcium bentonite with both 70° C. and 150° C. aging for 16 hours. The 150° C. test used a freshly made mud which was aged in a sealed bomb in a tumbling oven. Additional tests were conducted with the standard mud system contaminated with excess salt and gypsum. These two tests of contaminated mud at 70° C. and 150°, are described herein.

The FeLS dispersants prepared from the UF liquors have excellent dispersant properties. Of the several FeLS materials prepared, the preferred material was made with 12 g Fe/100 g of sulfonated UF liquor solids and 7.5 g H$_2$O$_2$/100 g of liquor solids. For ease of discussion a sample containing, for example, 12 g Fe/100 g of UF liquor solids will be designated as 12% Fe. However, analysis of this type of material reveals less than 12% iron content on a solids basis. The same percentages of H$_2$O$_2$ are used. Note that the tables list the iron and H$_2$O$_2$ levels as additions in g/100 g of liquor solids.

FeLS dispersants were made with iron levels ranging from 5 to 14%. Table XIX lists the results of mud tests with these dispersants. Within the 6 to 15% iron levels, the FeLS matched or exceeded the performance of the standard. The effects of varying H$_2$O$_2$ levels during the oxidation step on FeLS performance were evaluated in the mud system. Table XX contains the results of these mud tests at 6% and 9% iron content.

Two FeLS dispersants were made with copperas (technical grade ferrous sulfate) as an iron source for comparison with reagent grade ferrous sulfate heptahydrate (FeSO$_4$.7H$_2$O). The mud tests for these copperas derived FeLS materials are listed in Table XXI. These data show that the properties are the same for both the copperas and reagent ferrous sulfate derived FeLS. Several FeLS dispersants with varying iron levels were tested. Tables XXII and XXIII list the mud data for some FeLS dispersants in the regular mud test with aging at 70° C. and 150° C. respectively. These dispersants performed better than the standard in the 70° C. aging study. In the 150° C. aging study the 9% and 12% iron level dispersants outperformed the standard.

Selected dispersants were tested in the higher salt and gypsum contaminated 28% calcium bentonite mud system. Tables XXIV and XXV contain the mud data for these contaminated mud tests with aging at 70° C. and 150° C. respectively. Only the 12 and 14% iron level dispersants were significantly better than the standard in the contaminated test with 70° C. aging. The poorest dispersant performance showed up in this 150° C. contaminated mud test. Only the 12% Fe dispersant came near the acceptable performance level in the high temperature study.

The FeLS dispersants equal or exceed, for the most part, the performance of chrome lignosulfonates made from ultrafiltered liquor. The only significant drawback to the performance of these iron materials appears to be their thermal stability in a highly contaminated mud system. However, in the high temperature contaminated mud system, the 12% Fe dispersant is an acceptable replacement for chrome.

The properties of these FeLS dispersants were improved for both iron content and $H_2O_2$ level during the oxidation reaction. The performance improved up to the 12% Fe level (Table XIX). Upon reaching 14% Fe some properties, particularly the yield value, started to deteriorate. This effect showed up in both mud tests. Changing the $H_2O_2$ levels in the preparation of these materials affected their performance (Table XX). Decreasing the $H_2O_2$ level from 7.5% at 6% Fe lowered the quality of the FeLS. At the same iron level increasing the $H_2O_2$ level beyond 7.5% did not improve the dispersant. Smaller variations in $H_2O_2$ levels from 7.5% at 9% Fe did not significantly change the dispersant quality (Table XX). It appears that the $H_2O_2$ level of 7.5% which was the initial level in this study (Table XIX) results in the best dispersant quality.

The preparation of these materials and the results obtained are described below.

Preparation of Sulfonated Intermediate (8% $SO_2$)

To 1400 g. of a 36% total solids solution of UF liquor was added 57.2 g of 28% ammonia and 155.4 ml of ammonium bisulfite (515 g. $SO_2$/L; 8% $SO_2$ based on SSL solids). The mixture was placed in an autoclave, heated to 165° C. and maintained at that temperature for 35 minutes.

Preparation of Iron Lignosulfonate

To a sample of 8% $SO_2$ sulfonated ultrafiltered intermediate (100 g of solids) was added a solution of 60 g of $FeSO_4.7H_2O$ in 80 ml of water. After cooling in an ice bath 22.5 ml of 30% $H_2O_2$ was added at a rate that maintained a temperature below 50° C. This mixture was then heated with stirring in a 55° C. water bath for 30 minutes. The solution was spray dried to yield 138.5 g of iron lignosulfonate.

Contaminated Mud Test

To 425 g of 28% Calcium bentonite mud (350 ml) in a pint jar were added 5.0 g gypsum, 4.0 g sodium chloride and 8.0 g of dispersant This was hand stirred using the blade of a Hamilton Beach mixer. The jar was screwed onto the jar holder of the mixer and the mud was mixed for 30 seconds using a mixer speed of 7500±500 rpm. After a cut down (scraping the side of the jar into the bulk contents of the jar) the mud was mixed for 30 additional seconds at the same speed. After an additional cut down 5.00 ml of 25% NaOH was added to the mud. It was mixed for 3 minutes followed by a cut down and pH determination. Sufficient additional 25% NaOH (6 drops) was added to result in a pH of 9.8–9.9 after 3 more minutes of mixing. After this mix the pH was rechecked and the mud was mixed for 15 minutes. Determination of the pH revealed it to be 9.5 (9.4 to 9.6 was target). The flow properties were measured on a Fann 35 viscometer (see unaged properties in Table XXIV) The jar was tightly capped and rolled at 70° C. for 16 hours. The mud was cooled to 25° C. and the mud mixed for 5 minutes at 7500±500 rpm. The flow properties were redetermined (see the aged properties in Table XXIV). The contents of the jar were transferred to a Fann filter cell and the fluid loss properties were determined (see Table XXIV).

An identical mud was made as above and the unaged properties were determined (See Table XXV). The mud was sealed in a pressure bomb and tumbled for 16 hours at 150° C. The contents were cooled and transferred to a jar. The mud was mixed for 5 minutes at 25° C. The flow properties were determined (see aged properties in Table XXV). The contents were transferred to a Fann filter cell and the fluid loss properties were determined (see Table XXV).

TABLE XIX

| Mud Tests of Iron Lignosulfonates with Changing Iron Levels[a] | | | | | | | | |
|---|---|---|---|---|---|---|---|---|
| Fe (g/100 g of intermed. solids) | 5.0 | 6.0 | 7.0 | 8.0 | 9.0 | 10.0 | 12.0 | 14.0 |
| $H_2O_2$ (g/100 g of intermed. solids) | 7.49 | 7.49 | 7.49 | 7.49 | 7.49 | 7.49 | 7.49 | 7.49 |
| $SO_2$ (g/100 g of UF liquor solids) | 8.0 | 8.0 | 8.0 | 8.0 | 8.0 | 8.0 | 8.0 | 8.0 |
| Unaged | | | | | | | | |
| pH | 10.0/10.10 | 9.9/10.0 | 9.9/10.0 | 9.8/9.9 | 9.7/9.9 | 9.7/9.9 | 9.6/9.9 | 9.0/9.9 |
| Apparent viscosity (mPa.s) | 21/19 | 16/17 | 20/19 | 19.5/19 | 18/19 | 18/19.5 | 19.5/20 | 19/20 |
| Plastic viscosity (mPa.s) | 18/16 | 14/14 | 18/16 | 17/14 | 16/14 | 16/16 | 18/16 | 15/16 |
| Yield viscosity (lb/100 ft$^2$)[b] | 6/7 | 4/6 | 4/7 | 5/9 | 4/9 | 4/8 | 3/8 | 8/8 |
| Aged at 70° C. for 16 hours | | | | | | | | |
| pH | 9.0/8.6 | 8.9/8.5 | 9.0/8.6 | 8.8/8.5 | 8.8/8.5 | 8.9/8.5 | 8.8/8.5 | 8.5/8.5 |
| Apparent viscosity (mPa.s) | 20/18 | 16/16 | 17/18 | 15.5/17.5 | 15/17.5 | 15/18.5 | 14.5/18 | 15/18 |
| Plastic viscosity (mPa.s) | 13/12 | 12/12 | 13/12 | 13/12 | 12/12 | 13/12 | 13/12 | 12/12 |
| Yield value (lb/100 ft$^2$)[b] | 14/12 | 8/9 | 8/12 | 5/11 | 6/11 | 4/13 | 3/13 | 6/13 |
| 10 sec gel (lb/100 ft$^2$)[b] | 11/9 | 5/6 | 6/9 | 4/8 | 4/8 | 3/9 | 2/9 | 5/9 |
| 10 min gel (lb/100 ft$^2$)[b] | 23/17 | 13/13 | 14/17 | 10/16 | 10/16 | 10/18 | 9/12 | 11/12 |
| Fluid loss (ml/30 min) | 19.6/26.9 | 23.6/27.3 | 22.5/26.9 | 24.8/27.5 | 26.7/27.5 | 25.8/26.6 | 27.7/26.8 | 29.6/26.8 |

[a]The data are presented as follows: data for sample/data for CrLs standard (3.4% Cr)
[b]To convert lb/100 ft$^2$ to pascals, multiply by 0.4788.

TABLE XX

| Mud Tests of Iron Lignosulfonates with Changing Hydrogen Peroxide Levels[a] | | | | | | | |
|---|---|---|---|---|---|---|---|
| Fe (g/100 g of intermed. solids) | 6.0 | 6.0 | 6.0 | 6.0 | 9.0 | 9.0 | 9.0 |
| $H_2O_2$ (g/100 g of intermed. solids) | 3.75 | 5.63 | 7.49 | 9.36 | 6.66 | 7.49 | 8.32 |
| $SO_2$ (g/100 g of UF liquor solids) | 8.0 | 8.0 | 8.0 | 8.0 | 8.0 | 8.0 | 8.0 |
| Unaged | | | | | | | |
| pH | 9.9/10.0 | 10.0/10.0 | 10.0/10.0 | 9.9/10.0 | 9.7/9.9 | 9.7/9.9 | 9.7/9.9 |
| Apparent viscosity (mPa.s) | 16.5/19 | 17/19 | 21/19 | 25/19 | 17.5/19.5 | 18/19.5 | 21/19.5 |
| Plastic viscosity (mPa.s) | 14/15 | 15/15 | 17/15 | 20/15 | 16/16 | 16/16 | 19/16 |

TABLE XX-continued

Mud Tests of Iron Lignosulfonates with Changing Hydrogen Peroxide Levels[a]

| | | | | | | | |
|---|---|---|---|---|---|---|---|
| Yield value (lb/100 ft²)[b] | 5/8 | 4/8 | 8/8 | 10/8 | 3/8 | 4/8 | 4/8 |
| Aged at 70° C. for 16 hours | | | | | | | |
| pH | 9.0/8.5 | 9.0/8.5 | 9.0/8.5 | 8.8/8.5 | 8.8/8.5 | 8.8/8.5 | 8.8/8.5 |
| Apparent viscosity (mPa.s) | 20/18.5 | 19.5/18.5 | 18.5/18.5 | 19/18.5 | 16/18.5 | 16/18.5 | 16/18.5 |
| Plastic viscosity (mPa.s) | 12/12 | 12/12 | 12/12 | 13/12 | 12/12 | 13/12 | 13/12 |
| Yield value (lb/100 ft²)[b] | 16/13 | 15/13 | 13/13 | 12/13 | 8/13 | 6/13 | 6/13 |
| 10 sec gel (lb/100 ft²)[b] | 12/10 | 11/10 | 8/10 | 8/10 | 4/9 | 4/9 | 4/9 |
| 10 min gel (lb/100 ft²)[b] | 26/18 | 22/18 | 18/18 | 18/18 | 12/9 | 11/9 | 10/9 |
| Fluid loss (ml/30 min) | 24.9/26.9 | 24.8/26.9 | 21.1/26.9 | 17.6/26.9 | 25.8/26.6 | 25.6/26.6 | 24.0/26.6 |

[a]The data are presented as follows: data for sample/data for CrLs standard (3.4% Cr).
[b]To convert lb/100 ft² to pascals, multiply by 0.4788.

TABLE XXI

Mud Tests of Iron Lignosulfonates Made with Copperas

| | | |
|---|---|---|
| Fe (g/100 g of intermed. solids) | 6.0 | 9.0 |
| $H_2O_2$ (g/100 g of intermed. solids) | 7.49 | 7.49 |
| $SO_2$ (g/100 g of UF liquor solids) | 8.0 | 8.0 |
| Unaged | | |
| pH | 9.9/9.9 | 9.7/9.9 |
| Apparent viscosity (mPa.s) | 19.5/19.5 | 18/19.5 |
| Plastic viscosity (mPa.s) | 17/16 | 16/16 |
| Yield value (lb/100 ft²)[b] | 5/7 | 4/7 |
| Aged at 70° C. for 16 hours | | |
| pH | 9.0/8.5 | 8.8/8.5 |
| Apparent viscosity (mPa.s) | 18.5/18.5 | 16/18.5 |
| Plastic viscosity (mPa.s) | 13/12 | 13/12 |
| Yield value (lb/100 ft²)[b] | 11/13 | 6/13 |
| 10 sec gel (lb/100 ft²)[b] | 7/9 | 4/9 |
| 10 min gel (lb/100 ft²)[b] | 17/17 | 11/17 |
| Fluid loss (ml/30 min) | 23.9/26.6 | 25.6/26.6 |

[a]The data are presented as follows: data for sample/data for CrLS standard (3.4% Cr).
[b]To convert lb/100 ft² to pascals, multiply by 0.4788.

TABLE XXII

Standard Mud Tests with 70° C. Aging for Iron Lignosulfonates

| | | | | | | |
|---|---|---|---|---|---|---|
| Fe (g/100 g of intermed. solids) | 6.0 | 8.0 | 9.0 | 10.0 | 12.0 | 14.0 |
| $H_2O_2$ (g/100 g of intermed. solids) | 7.49 | 7.49 | 7.49 | 7.49 | 7.49 | 7.49 |
| $SO_2$ (g/100 g of UF liquor solids) | 8.0 | 8.0 | 8.0 | 8.0 | 8.0 | 8.0 |
| Unaged | | | | | | |
| pH | 9.6/9.5 | 9.5/9.6 | 9.6/9.6 | 9.6/9.5 | 9.6/9.5 | 9.5/9.5 |
| Apparent viscosity (mPa.s) | 32/35 | 27.5/29 | 26/29 | 26/28 | 26/28 | 27.5/28 |
| Plastic viscosity (mPa.s) | 26/21 | 23/20 | 23/20 | 22/20 | 22/20 | 20/20 |
| Yield value (lb/100 ft²)[b] | 13/28 | 9/18 | 6/18 | 8/18 | 8/18 | 15/18 |
| Aged at 70° C. for 16 hours | | | | | | |
| Aged pH | 8.6/8.4 | 8.6/8.2 | 8.7/8.2 | 8.6/8.2 | 8.6/8.2 | 8.7/8.2 |
| Adjusted pH | 9.5/9.5 | 9.4/9.5 | 9.5/9.5 | 9.6/9.5 | 9.6/9.5 | 9.5/9.5 |
| Apparent viscosity (mPa.s) | 37/24.5 | 28/27 | 27/27 | 26.5/28 | 26/28 | 24.5/28 |
| Plastic viscosity (mPa.s) | 23/21 | 21/20 | 21/20 | 21/20 | 21/20 | 20/20 |
| Yield value (lb/100 ft²)[b] | 28/26 | 14/15 | 12/15 | 11/16 | 10/16 | 9/16 |
| 10 sec gel (lb/100 ft²)[b] | 24/21 | 10/13 | 9/13 | 8/13 | 8/13 | 11/13 |
| 10 min gel (lb/100 ft²)[b] | 47/39 | 25/27 | 23/27 | 23/27 | 23/27 | 26/27 |
| Fluid loss (ml/30 min) | 18.2/22.4 | 18.6/22.8 | 21.7/22.8 | 21.9/23.0 | 22.6/23.0 | 24.0/23.0 |

[a]The data are presented as follows: data for sample/data for CrLs standard lot (4% Cr)
[b]To convert lb/100 ft² to pascals, multiply by 0.4788.

TABLE XXIII

Standard Mud Tests with 150° C. Aging for Iron Lignosulfonates

| | | | |
|---|---|---|---|
| Fe (g/100 g of intermed. solids) | 6.0 | 9.0 | 12.0 |
| $H_2O_2$ (g/100 g of intermed. solids) | 7.49 | 7.49 | 7.49 |
| $SO_2$ (g/100 g of UF liquor solids) | 8.0 | 8.0 | 8.0 |
| Unaged | | | |
| pH | 9.6/9.6 | 9.6/9.5 | 9.5/9.5 |
| Apparent viscosity (mPa.s) | 31/36 | 27/28 | 26/28 |
| Plastic viscosity (mPa.s) | 24/22 | 22/20 | 22/20 |
| Yield value (lb/100 ft²)[b] | 14/28 | 9/18 | 7/18 |
| Aged at 70° C. for 16 hours | | | |
| Aged pH | 6.9/6.8 | 7.0/6.8 | 7.0/6.8 |
| Apparent viscosity (mPa.s) | 57.5/60 | 46/48 | 48/48 |
| Plastic viscosity (mPa.s) | 18/18 | 15/16 | 17/16 |
| Yield value (lb/100 ft²)[b] | 78/84 | 62/64 | 61/64 |
| 10 sec gel (lb/100 ft²)[b] | 50/52 | 42/41 | 42/41 |
| 10 min gel (lb/100 ft²)[b] | 52/52 | 43/44 | 43/42 |
| Fluid loss (ml/30 min) | 30.4/29.7 | 29.8/30.5 | 30.2/30.5 |

[a]The data are presented as follows: data for sample/data for CrLS standard (4% Cr).
[b]To convert lb/100 ft² to pascals, multiply by 0.4788.

TABLE XXIV

Contaminated Mud Test with 70° C. Aging for Iron Lignosulfonates[a]

| | | | | | | |
|---|---|---|---|---|---|---|
| Fe (g/100 g of intermed. solids) | 6.0 | 8.0 | 9.0 | 10.0 | 12.0 | 14.0 |
| $H_2O_2$ (g/100 g of intermed. solids) | 7.49 | 7.49 | 7.49 | 7.49 | 7.49 | 7.49 |
| $SO_2$ (g/100 g of UF liquor solids) | 8.0 | 8.0 | 8.0 | 8.0 | 8.0 | 8.0 |
| Unaged | | | | | | |
| pH | 9.5/9.5 | 9.5/9.5 | 9.5/9.5 | 9.5/9.5 | 9.6/9.5 | 9.5/9.5 |
| Apparent viscosity (mPa.s) | 33.5/36 | 35/36 | 34.5/36 | 32.5/36 | 29.5/36 | 29/36 |
| Plastic viscosity (mPa.s) | 28/24 | 29/24 | 31/24 | 28/24 | 26/24 | 26/24 |
| Yield value (lb/100 ft²)[b] | 11/24 | 12/24 | 7/24 | 9/24 | 7/24 | 6/24 |
| Aged at 70° C. for 16 hours | | | | | | |
| Aged pH | 8.6/8.3 | 8.7/8.3 | 8.8/8.3 | 8.8/8.3 | 8.9/8.3 | 8.8/8.3 |
| Apparent viscosity (mPa.s) | 32/27 | 31/27 | 31/27 | 29/27 | 27/27 | 27.5/27 |
| Plastic viscosity (mPa.s) | 25/23 | 28/23 | 29/23 | 28/23 | 27/23 | 27/23 |
| Yield value (lb/100 ft²)[b] | 14/9 | 6/9 | 4/9 | 2/9 | 0/9 | 1/9 |
| 10 sec gel (lb/100 ft²)[b] | 7/6 | 3/6 | 3/6 | 2/6 | 1/6 | 3/6 |

TABLE XXIV-continued

| Contaminated Mud Test with 70° C. Aging for Iron Lignosulfonates[a] | | | | | | |
|---|---|---|---|---|---|---|
| 10 min gel (lb/100 ft$^2$)[b] | 27/19 | 19/19 | 17/19 | 14/19 | 12/19 | 13/19 |
| Fluid loss (ml/30 min) | 11.3/24.0 | 12.0/24.0 | 14.4/24.0 | 15.1/24.0 | 18.4/24.0 | 24.0/24.0 |

[a]The data are presented as follows: data for sample/data for CrLs standard (4% Cr)
[b]To convert lb/100 ft$^2$ to pascals, multiply by 0.4788.

TABLE XXV

| Contaminated Mud Tests with 150° C. Aging for Iron Lignosulfonates[a] | | | | |
|---|---|---|---|---|
| Fe (g/100 g of intermed. solids) | 6.0 | 9.0 | 12.0 | 14.0 |
| H$_2$O$_2$ (g/100 g of intermed. solids) | 7.49 | 7.49 | 7.49 | 7.49 |
| SO$_2$ (g/100 g of UF liquor solids) | 8.0 | 8.0 | 8.0 | 8.0 |
| Unaged | | | | |
| pH | 9.6/9.5 | 9.6/9.5 | 9.4/9.4 | 9.4/9.4 |
| Apparent viscosity (mPa.s) | 36/34.5 | 33/34.5 | 31/36 | 29.5/36 |
| Plastic viscosity (mPa.s) | 30/24 | 30/24 | 28/24 | 26/24 |
| Yield value (lb/100 ft$^2$)[b] | 13/21 | 8/21 | 6/24 | 7/24 |
| Aged at 70° C. for 16 hours | | | | |
| Aged pH | 6.8/6.6 | 7.0/6.6 | 7.0/6.7 | 7.1/6.7 |
| Aged pH | | | | |
| Apparent viscosity (mPa.s) | 54/45 | 54/45 | 57/48 | 59/48 |
| Plastic viscosity (mPa.s) | 18/19 | 18/19 | 21/20 | 22/20 |
| Yield value (lb/100 ft$^2$)[b] | 72/52 | 71/52 | 72/58 | 74/58 |
| 10 sec gel (lb/100 ft$^2$)[b] | 47/35 | 46/35 | 48/41 | 50/41 |
| 10 min gel (lb/100 ft$^2$)[b] | 48/37 | 46/37 | 50/40 | 50/40 |
| Fluid loss (ml/30 min) | 15.6/30.4 | 20.7/30.4 | 25.6/28.8 | 27.6/28.8 |

[a]The data are presented as follows: data for sample/data for CrLs standard (4% Cr)
[b]To convert lb/100 ft$^2$ to pascals, multiply by 0.4788.

EXAMPLE 9

Changes in the sulfonation reaction time (5 to 180 minutes) of ultrafiltered lignosulfonates were studied in the preparation of ferric sulfate derived iron lignosulfonates. Over the range of reaction times studied, the oil well drilling fluid dispersant properties were found to be relatively constant. This example contains a brief survey of the effects that varying sulfonation reaction times have on the performance of Fe(III)LS dispersants.

Sulfonation of the 30% total solids UF lignosulfonate solutions was accomplished using 8.0% sulfur dioxide (SO$_2$) was ammonium bisulfite and 0.38% ammonia (based on SSL solids). The sulfonation was carried out at 165° C. as previously described for paper pulp liquors. For two of the sulfonations, the reaction times at 165° C. were 5 and 180 minutes, respectively. The other sulfonation used the previously established 35 minutes at 165° C. The resulting Fe(III)LS dispersants were prepared with 9.0% iron and 3.0% hydrogen peroxide (H$_2$O$_2$) based on liquor solids. The Fe(III)LS dispersants were evaluated in the standard mud test with 70° C. aging. The high temperature mud tests in the contaminated mud system with 150° C. aging were conducted as previously described.

Table XXVI contains the analytical data of three liquors from 5, 35 and 180 minutes sulfonations at 165° C. Increasing the reaction time results in some detectable liquor differences. The final liquor pH decreased with increased reaction time. A concomitant reduction in sulfite concentration occurs.

The effects of sulfonation reaction time on the resulting Fe(III)LS dispersant performance were determined in two mud systems. Table XXVII contains the FE-(III)LS dispersant data in the standard mud test with 70° C. aging for 16 hours. Table XXVIII contains similar data for the contaminated mud test with 150° C. aging for 16 hours.

At the previously established 8% SO$_2$ level, the sulfonation time of 5 to 180 minutes minimally affects the resultant Fe(III)LS dispersant performance. There was essentially no change in dispersant properties. This observation holds for both the standard and contaminated mud tests. The apparent increased lignin sulfonation at 180 minutes of reaction does not improve the Fe(III)LS performance. This result contrasts with chromium lignosulfonates where the performance deteriorates with a 180 minute sulfonation time.

TABLE XXVI

| Analyses of Sulfonated ultrafiltered Intermediate. | | | |
|---|---|---|---|
| Sulfonation Condition | | | |
| SO$_2$ (g/100 g of Liquor Solids) | 8.0 | 8.0 | 8.0 |
| NH$_3$ (g/100 g of Liquor Solids) | 0.38 | 0.38 | 0.38 |
| Time at 165° C. (minutes) | 5 | 35 | 180 |
| Total Solids | 28.86 | 28.84 | 29.33 |
| Viscosity (cps) | 15.6 | 15.2 | 17.1 |
| pH | 5.2 | 4.6 | 3.4 |
| Chemical Analyses (% OD) | | | |
| Sodium | 3.0 | 2.9 | 2.8 |
| Methoxyl | 11.4 | 11.2 | 11.2 |
| Sulfur (as S) | 9.6 | 9.7 | 9.5 |
| Sulfite (as S) | 1.3 | 1.0 | 0.07 |
| Sulfate (as S) | 0.64 | 1.86 | 0.66 |
| Ash | 12.0 | 12.0 | 11.8 |
| Reducing Substances | 5.0 | 4.9 | 4.3 |
| Total Free Sugars | 0.0 | 0.0 | 0.0 |
| Galactose | 0.0 | 0.0 | 0.0 |
| Glucose | 0.0 | 0.0 | 0.0 |
| Mannose | 0.0 | 0.0 | 0.0 |
| Arabinose | 0.0 | 0.0 | 0.0 |
| Xylose | 0.0 | 0.0 | 0.0 |
| Total Sugars (after hydrolysis) | 0.4 | 0.4 | 0.3 |
| Galactose | 0.0 | 0.0 | 0.0 |
| Glucose | 0.0 | 0.0 | 0.0 |
| Mannose | 0.4 | 0.4 | 0.3 |
| Arabinose | 0.0 | 0.0 | 0.0 |
| Xylose | 0.0 | 0.0 | 0.0 |
| Sodium Lignosulfonate | 92.4 | 94.4 | 100.0 |
| Phenolic Hydroxyl (lignin) | 1.9 | 2.0 | 2.1 |

TABLE XXVII

Performance of Fe(III)LS Dispersants in the Standard CrLS Mud Test with 70° C. Aging.

| Sulfonation Conditions | | | |
|---|---|---|---|
| $SO_2$ (g/100 g of Liquor Solids) | 8.0 | 8.0 | 8.0 |
| $NH_3$ (g/100 g of Liquor Solids) | 0.38 | 0.38 | 0.38 |
| Time at 165° C. (minutes) | 5 | 35 | 180 |
| Unaged Properties[a] | | | |
| pH | 9.6/9.5 | 9.6/9.5 | 9.6/9.5 |
| Apparent Viscosity (cps) | 30.5/34 | 27.5/34 | 30/34 |
| Plastic Viscosity (cps) | 25/24 | 24/24 | 26/24 |
| Yield Value (lb/100 ft$^2$) | 11/20 | 7/20 | 8/20 |
| Aged at 70° C. for 16 hours[a] | | | |
| Aged pH | 8.6/8.2 | 8.7/8.2 | 8.6/8.2 |
| Adjusted pH | 9.6/9.5 | 9.5/9.5 | 9.5/9.5 |
| Apparent Viscosity (cps) | 30/30 | 29/30 | 28.5/30 |
| Plastic Viscosity (cps) | 22/20 | 22/20 | 23/20 |
| Yield Value (lb/100 ft$^2$) | 16/20 | 14/20 | 11/20 |
| 10 sec Gel (lb/100 ft$^2$) | 16/18 | 15/18 | 12/18 |
| 10 min Gel (lb/100 ft$^2$) | 25/34 | 33/34 | 30/34 |
| Fluid Loss (ml/30 min) | 20.3/21.6 | 20.3/21.6 | 19.2/21.6 |

[a]These data are represented as follows: Data for Sample/Data for CrLS Standard (4% Cr).

TABLE XXVIII

Performance of Fe(III)LS Dispersants in the Contaminated CrLS Mud Test with 150° C. Aging.

| Sulfonation Conditions | | | |
|---|---|---|---|
| $SO_2$ (g/100 g of Liquor Solids) | 8.0 | 8.0 | 8.0 |
| $NH_3$ (g/100 g of Liquor Solids) | 0.38 | 0.38 | 0.38 |
| Time at 165° C. (minutes) | 5 | 35 | 180 |
| Unaged Properties[a] | | | |
| pH | 9.5/9.5 | 9.5/9.5 | 9.5/9.5 |
| Apparent Viscosity (cps) | 35/43 | 32/43 | 39/43 |
| Plastic Viscosity (cps) | 32/21 | 30/21 | 35/21 |
| Yield Value (lb/100 ft$^2$) | 6/24 | 4/24 | 8/24 |
| Aged at 150° C. for 16 hours[a] | | | |
| Aged pH | 6.9/6.7 | 6.8/6.7 | 6.9/6.7 |
| Apparent Viscosity (cps) | 65.5/54 | 65/54 | 66.5/54 |
| Plastic Viscosity (cps) | 21/20 | 22/20 | 22/20 |
| Yield Value (lb/100 ft$^2$) | 89/68 | 86/68 | 89/68 |
| 10 sec Gel (lb/100 ft$^2$) | 60/43 | 61/43 | 59/43 |
| 10 min Gel (lb/100 ft$^2$) | 56/44 | 62/44 | 56/44 |
| Fluid Loss (ml/30 min) | 22.6/28.0 | 24.7/28.0 | 20.4/28.0 |

[a]These data are represented as follows: Data for Sample/Data for CrLS Standard (4% Cr).

EXAMPLE 10

Improved properties of titanium lignosulfonate oil well drilling fluid dispersants result from the use of ultrafiltered spent sulfite liquor (SSL). The aged properties of the titanium lignosulfonate thinned muds equal the properties of existing chromium based dispersant treated muds. These dispersants result from the reaction of titanium(IV) oxide sulfate and hydrogen peroxide with ultrafiltered sulfonated sodium-base SSL. The ultrafiltration process appears essential in achieving desirable dispersant properties. These titanium lignosulfonate dispersants have significantly better fluid loss properties than existing chromium based dispersants.

Titanium lignosulfonates have previously demonstrated encouraging properties as chromeless oil well drilling fluid dispersants. Improvement of these initial properties suggests use of ultrafiltered (UF) SSL for making these dispersants. Using the UF liquors in titanium lignosulfonates results in mud properties that are comparable to the present chromium based lignosulfonate system.

The titanium lignosulfonates were made from modified production liquors. The details of the reaction of a titanium(IV) oxide sulfate ($TiOSO_4$) and hydrogen peroxide with the modified liquors are shown below. The UF liquors were prepared using an Abcor SWM-100 membrane. Fermented SSL was obtained by fermentation of liquor with baker's yeast (*Saccharomyces cerevisiae*). These liquors were sulfonated with ammonium bisulfite and ammonium hydroxide as shown below.

The titanium lignosulfonates were tested in 25% bentonite mud. The muds were prepared and aged at 70° C. for 16 hours. Tables XXIX, XXX, and XXXI list the mud data of dispersants prepared with UF liquor. The control liquor (not ultrafiltered) dispersant mud data are contained in Table XXXII. The data for unsulfonated UF liquor titanium dispersants are listed in Table XXXIII. Table XXXIV shows the mud data for the titanium dispersants derived from fermented SSL.

Good quality titanium dispersants required UF liquor which had been sulfonated with 8% $SO_2$ or 10% $SO_2$ (based on UF SSL solids). The aged properties of these dispersants nearly matched the performance of chromium lignosulfonate. The mud weights are nearly identical to those of chromium lignosulfonate dispersed muds. The fluid loss control of the titanium dispersant muds is significantly improved over the chromium system. Comparison of the data in Table XXIX with those in Table XXX show the reproducibility of these results. These data are for different dispersants prepared from the same UF liquor source. Using a different batch of UF liquor resulted in dispersants of similar quality.

Various combinations of the reaction of $TiOSO_4$ and hydrogen peroxide with sulfonated UF liquors result in large changes in dispersant properties. The dispersant properties improved with increased $SO_2$ levels in the sulfonation step. Considerable improvement of unaged properties resulted at the 10% $SO_2$ level. Titanium dispersants also appear quite sensitive to hydrogen peroxide levels used in their preparation. Initially the dispersants gelled during perparation when higher oxidizer levels were used. Reducing the level of hydrogen peroxide resulted in usable dispersants.

Example of the preparation of titantium lignosulfonate

To a sample of 8% $SO_2$ sulfonated ultrafiltered intermediate (100 g of solids) was added 16.7 g of $TiOSO_4$. While stirring at room temperature 15.0 ml of 30% hydrogen peroxide was added over a five minute period. The mixture was then heated with stirring in a 55° C. water bath for 30 minutes. The solution was spray dried to yield 108.5 g of titanium lignosulfonate.

TABLE XXIX

Ultrafiltered Liquor Derived Titanium Lignosulfonate Mud Data (First Run)

| | | | | | | | |
|---|---|---|---|---|---|---|---|
| Ti (g/100 g of intermediate)[a] | | 5.0 | 5.0 | | 5.0 | | 5.0 |
| $H_2O_2$ (g/100 g of intermediate) | Standard | 5.0 | 5.0 | Standard | 5.0 | Standard | 5.0 |
| $SO_2$ (g/100 g of UF liquor) | | 6.0 | 8.0 | | 8.0 | | 10.0 |
| Unaged | | | | | | | |
| pH | 9.9 | 10.3 | 10.3 | 10.0 | 10.2 | 9.9 | 10.2 |
| apparent viscosity (mPa.s) | 16 | 40 | 31.5 | 16 | 33.5 | 19 | 25.5 |
| Plastic viscosity (mPa.s) | 13 | 19 | 19 | 13 | 20 | 15 | 19 |
| Yield viscosity (lb/100 ft$^2$)[b] | 6 | 42 | 25 | 6 | 27 | 8 | 13 |

TABLE XXIX-continued

Ultrafiltered Liquor Derived Titanium Lignosulfonate Mud Data (First Run)

| | | | | | | | |
|---|---|---|---|---|---|---|---|
| Mud weight (kg/m$^3$) | — | — | — | 1198 | 1186 | — | — |
| Aged at 70° C. for 16 hours | | | | | | | |
| pH | 8.5 | 9.1 | 9.2 | 8.5 | 9.2 | 8.5 | 9.2 |
| Apparent viscosity (mPa.s) | 15 | 21 | 17 | 15 | 18 | 17 | 18.5 |
| Plastic viscosity (mPa.s) | 11 | 14 | 13 | 10 | 13 | 11 | 14 |
| Yield viscosity (lb/100 ft$^2$) | 8 | 14 | 8 | 10 | 10 | 12 | 9 |
| 10 sec gel (lb/100 ft$^2$)$^b$ | 6 | 8 | 5 | 6 | 5 | 8 | 6 |
| 10 min gel (lb/100 ft$^2$)$^b$ | 12 | 20 | 12 | 12 | 13 | 16 | 16 |
| Fluid loss (ml/30 min) | 27.7 | 11.8 | 12.0 | 27.3 | 11.5 | 26.7 | 15.5 |
| Mud weight (kg/m$^3$) | — | — | — | 1198 | 1186 | — | — |

$^a$The Ti level is based on TiOSO$_4$ with 29.94% Ti.
$^b$To convert lb/100 ft$^2$ to pascals, multiply by 0.4788.

TABLE XXX

Ultrafiltered Liquor Derived Titanium Lignosulfonate Mud Data (Second Run)

| | | | | |
|---|---|---|---|---|
| Ti (g/100 g of intermediate)$^a$ | | 5.0 | 5.0 | 5.0 |
| H$_2$O$_2$ (g/100 g of intermediate) | Standard | 5.0 | 5.0 | 5.0 |
| SO$_2$ (g/100 g of UF liquor) | | 6.0 | 8.0 | 8.0 |
| Unaged | | | | |
| pH | 10.0 | 10.3 | 10.3 | 10.3 |
| Apparent viscosity (mPa.s) | 17 | 39 | 34 | 34 |
| Plastic viscosity (mPa.s) | 14 | 21 | 23 | 23 |
| Yield viscosity (lb/100 ft$^2$)$^b$ | 6 | 36 | 22 | 22 |
| Aged at 70° C. for 16 hours | | | | |
| pH | 8.5 | 9.1 | 9.2 | 9.1 |
| Apparent viscosity (mPa.s) | 16 | 21 | 18.5 | 18 |
| Plastic viscosity (mPa.s) | 12 | 13 | 14 | 14 |
| Yield viscosity (lb/100 ft$^2$)$^b$ | 9 | 16 | 9 | 8 |
| 10 sec gel (lb/100 ft$^2$)$^b$ | 6 | 8 | 5 | 5 |
| 10 min gel (lb/100 ft$^2$)$^b$ | 13 | 21 | 13 | 13 |
| Fluid loss (ml/30 min) | 27.3 | 12.0 | 11.4 | 11.7 |

$^a$The Ti level is based on TiOSO$_4$ with 29.94% Ti.
$^b$To convert lb/100 ft$^2$ to pascals, multiply by 0.4788.

TABLE XXXI

Ultrafiltered Liquor Derived Titanium Lignosulfonate Mud Data

| | | | | | | |
|---|---|---|---|---|---|---|
| Ti (g/100 g of intermediate)$^a$ | CrLs | 5.0 | CrLs | 5.0 | 5.0 | 5.0 |
| H$_2$O$_2$ (g/100 g of intermediate) | Standard | 3.75 | Standard | 3.75 | 5.0 | 5.0 |
| SO$_2$ (g/100 g of UF liquor) | (3.4% Cr) | 6.0 | (3.4% Cr) | 8.0 | 6.0 | 8.0 |
| Unaged | | | | | | |
| pH | 9.8 | 10.3 | 10.0 | 10.3 | 10.3 | 10.3 |
| Apparent viscosity (mPa.s) | 14.5 | 30 | 16.0 | 24 | 45 | 36.5 |
| Plastic viscosity (mPa.s) | 12 | 19 | 14 | 18 | 15 | 19 |
| Yield viscosity (lb/100 ft$^2$)$^b$ | 5 | 22 | 6 | 12 | 60 | 35 |
| Aged at 70° C. for 16 hours | | | | | | |
| pH | 8.5 | 9.1 | 8.6 | 9.2 | 9.2 | 9.2 |
| Apparent viscosity (mPa.s) | 14.5 | 18.5 | 15 | 17.5 | 33 | 19.5 |
| Plastic viscosity (mPa.s) | 11 | 13 | 11 | 13 | 14 | 14 |
| Yield viscosity (lb/100 ft$^2$)$^b$ | 7 | 11 | 8 | 9 | 38 | 9 |
| 10 sec gel (lb/100 ft$^2$)$^b$ | 5 | 6 | 6 | 6 | 29 | 7 |
| 10 min gel (lb/100 ft$^2$)$^b$ | 12 | 15 | 13 | 13 | 32 | 16 |
| Fluid loss (ml/30 min) | 28.0 | 12.2 | 27.9 | 14.8 | 16.6 | 12.8 |

$^a$The Ti level is based on TiOSO$_4$ with 29.9% Ti.
$^b$To convert lb/100 ft$^2$ to pascals, multiply by 0.4788.

TABLE XXXII

Control Mud Data
Liquor Derived Titanium Lignosulfonate

| | | | | |
|---|---|---|---|---|
| Ti (g/100 g of intermediate)$^a$ | CrLS | 5.0 | CrLS | 5.0 |
| H$_2$O$_2$ (g/100 g of intermediate) | Standard | 3.75 | Standard | 3.75 |
| SO$_2$ (g/100 g of UF liquor) | (3.4% Cr) | 6.0 | (3.4% Cr) | 8.0 |
| Unaged | | | | |
| pH | 9.9 | 10.2 | 9.8 | 10.2 |
| Apparent viscosity (mPa.s) | 19 | 27.5 | 14.5 | 21.5 |
| Plastic viscosity (mPa.s) | 15 | 15 | 12 | 12 |
| Yield viscosity (lb/100 ft$^2$)$^b$ | 8 | 25 | 5 | 19 |
| Aged at 70° C. for 16 hours | | | | |
| pH | 8.5 | 8.9 | 8.5 | 9.0 |
| Apparent viscosity (mPa.s) | 17 | 32 | 14.5 | 26 |
| Plastic viscosity (mPa.s) | 11 | 11 | 11 | 11 |
| Yield viscosity (lb/100 ft$^2$)$^b$ | 12 | 42 | 7 | 30 |
| 10 sec gel (lb/100 ft$^2$)$^b$ | 8 | 31 | 5 | 25 |
| 10 min gel (lb/100 ft$^2$)$^b$ | 16 | 33 | 12 | 25 |
| Fluid loss (ml/30 min) | 26.7 | 25.4 | 28.0 | 29.4 |

$^a$The Ti is based on TiOSO$_4$ with 29.94% Ti.
$^b$To convert lb/100 ft$^2$ to pascals, multiply by 0.4788.

TABLE XXXIII

Unsulfonated Ultrafiltered dissolving grade pulp SSL Derived Titanium Lignosulfonate Mud Data

| | | |
|---|---|---|
| Ti (g/100 g of intermediate)$^a$ | CrLS (3.4% Cr) | 5.0 |
| H$_2$O$_2$ (g/100 g of intermediate) | Standard | 3.75 |
| Unaged | | |
| pH | 9.9 | 10.5 |
| Apparent viscosity (mPa.s) | 18 | 76 |
| Plastic viscosity (mPa.s) | 14 | 19 |
| Yield viscosity (lb/100 ft$^2$)$^b$ | 8 | 114 |
| Aged at 70° C. for 16 hours | | |
| pH | 8.4 | 8.7 |
| Apparent viscosity (mPa.s) | 18 | 50 |
| Plastic viscosity (mPa.s) | 12 | 14 |
| Yield viscosity (lb/100 ft$^2$)$^b$ | 12 | 72 |
| 10 sec gel (lb/100 ft$^2$)$^b$ | 8 | 54 |
| 10 min gel (lb/100 ft$^2$)$^b$ | 16 | 53 |
| Fluid loss (ml/30 min) | 26.6 | 26.3 |

$^a$The Ti level is based on TiOSO$_4$ with 29.94% Ti.
$^b$To convert lb/100 ft$^2$ to pascals, multiply by 0.4788.

TABLE XXXIV

Fermented Liquor Derived Titanium Lignosulfonate Mud Data

| | | | |
|---|---|---|---|
| Ti (g/100 g of intermediate)$^a$ | CrLS | 5.0 | 5.0 |
| H$_2$O$_2$ (g/100 g of intermediate) | Standard | 3.79 | 3.79 |
| SO$_2$ (g/100 g of UF liquor) | (3.4% Cr) | 6.0 | 8.0 |

TABLE XXXIV-continued

Fermented Liquor Derived Titanium Lignosulfonate Mud Data

| Unaged | | | |
|---|---|---|---|
| pH | 9.9 | 10.3 | 10.2 |
| Apparent viscosity (mPa.s) | 19 | 21.5 | 23 |
| Plastic viscosity (mPa.s) | 15 | 15 | 16 |
| Yield viscosity (lb/100 ft$^2$)$^b$ | 7 | 13 | 14 |
| Aged at 70° C. for 16 hours | | | |
| pH | 8.5 | 9.1 | 9.2 |
| Apparent viscosity (mPa.s) | 17 | 24.5 | 25 |
| Plastic viscosity (mPa.s) | 11 | 12 | 13 |
| Yield viscosity (lb/100 ft$^2$)$^b$ | 12 | 25 | 24 |
| 10 sec gel (lb/100 ft$^2$)$^b$ | 8 | 18 | 20 |
| 10 min gel (lb/100 ft$^2$)$^b$ | 16 | 33 | 33 |
| Fluid loss (ml/30 min) | 26.7 | 25.0 | 24.6 |

$^a$The Ti level is based on TiOSO$_4$ with 29.94% Ti.
$^b$To convert lb/100 ft$^2$ to pascals, multiply by 0.4788.

EXAMPLE 11

The thermal stabilities of titanium and iron lignosulfonate oil well drilling mud dispersants were compared to that of existing chromium lignosulfonate dispersant. The iron lignosulfonate performed better than the titanium lignosulfonate after high temperature aging of the treated mud (16 hours at 154° C.). However, the titanium system started to break down at the same temperature as commercial chromium based dispersant, while the iron system broke down at a lower temperature.

The preparation and mud dispersant characteristics of UF liquor derived FeLS and TiLS have been reported in the previous examples. For thermal studies, fresh muds were prepared with these dispersants by using a 25% bentonite mud. The muds were sealed in pressure bombs and heated in a tumbling oven at 154° C. for 16 hours. The thermal effects on viscosity were determined on a Fann 50B viscometer using muds aged at 70° C. for 16 hours. The viscosities were measured with a 90 minute heating cycle to 235° C. using a rotor speed of 200 rpm.

The thermal stability studies demonstrated favorable results for both FeLs and TiLS treated muds. FeLS performed slightly better than TiLS after heat aging at 154° C. for 16 hours. In this test both the iron and titanium systems were comparable to the performance of commercial chromium based dispersants. The viscosity properties of the TiLS treated mud broke down at 150° C. while the FeLS treated mud starts to break down at 100° C.

The data in Table XXXV show the favorable comparison of the properties of FeLS and TiLS treated muds with a commercial chromium based dispersant treated mud after heat aging at 154° C. for 16 hours. After heat aging, all the viscosity measurements of the two chromeless dispersant treated muds remain close to those for the chromium based dispersant system. Even after heat aging the TiLS treated mud maintained better fluid loss control than the chromium based dispersant treated mud.

The viscosities of four muds were determined as a function of temperature. Table XXXVI lists the properties of the FeLS, two TiLS and commercial chromium based dispersant treated muds after aging for 16 hours at 70° C. at the start of the high temperature studies. The viscosity of these muds as a function of temperature is shown in FIG. 18. This figure shows that the TiLS treated system maintains fairly constant mud viscosities up to the same temperature where the mud with commercial chromium based dispersant stated to break down. Although the FeLS treated mud started deterioration at a lower temperature, the viscosity of this iron system remains lower than the titanium system at the higher temperature.

TABLE XXXV

| | Mud Properties after Heat Aging at 154° C. for 16 hours | | | | | |
|---|---|---|---|---|---|---|
| Dispersant Type | Chromium LS | TiLS (8% SO$_2$) | TiLS (8% SO$_2$) | | FeLS | FeLS |
| pH | 7.6 | 7.6 | 7.6 | 7.6 | 7.6 | 7.5 |
| Apparent viscosity (mPa.s) | 34 | 34.5 | 37.5 | 38.5 | 35.5 | 37.5 |
| Plastic viscosity (mPa.s) | 11 | 11 | 11 | 12 | 12 | 12 |
| Yield viscosity (lb/100 ft$^2$) | 46 | 47 | 53 | 53 | 47 | 51 |
| 10 Sec Gel (lb/100 ft$^2$)$^a$ | 32 | 32 | 37 | 37 | 34 | 35 |
| 10 Min Gel (lb/100 ft$^2$)$^a$ | 34 | 33 | 36 | 36 | 34 | 34 |
| Fluid Loss (ml/30 min) | 32.2 | 31.8 | 26.0 | 25.8 | 32.4 | 32.2 |

$^a$To convert lb/100 ft$^2$ to pascals, multiply by 0.4788.

TABLE XXXVI

Properties of Drilling Mud Used in Fann 50B Viscosity Determinations

| Dispersant Type | CrLS | TiLS (8% SO$_2$) | TiLS (10% SO$_2$) | FeLS |
|---|---|---|---|---|
| Aged at 70° C. for 16 hours | | | | |
| pH | 8.5 | 9.3 | 9.2 | 9.0 |
| Apparent Viscosity (mPa.s) | 19 | 23 | 19.5 | 18 |
| Plastic Viscosity (mPa.s) | 13 | 15 | 14 | 13 |
| Yield Viscosity (lb/100 ft$^2$)$^a$ | 12 | 21 | 11 | 10 |
| 10 Sec Gel (lb/100 ft$^2$)$^a$ | 9 | 9 | 7 | 8 |
| 10 Min Gel (lb/100 ft$^2$)$^a$ | 18 | 21 | 17 | 17 |
| Before Fann 50B Test pH | 9.9 | 10.0 | 10.0 | 9.9 |
| After Fann 50B Test pH | 6.0 | 6.7 | 6.9 | 6.6 |

$^a$To convert lb/100 ft$^2$ to pascals, multiply by 0.4788.

EXAMPLE 12

Zirconium lignosulfonates (ZrLS) were studied as new chromeless oil well drilling fluid dispersants. These dispersants are prepared by reacting zirconium(IV) sulfate and hydrogen peroxide with ultrafiltered (UF) sulfonated sodium-base spent sulfite liquor. This dispersant equaled the performance of titanium lignosulfonate prepared earlier.

The zirconium lignosulfonates were made from UF paper pulp liquor. The UF liquors were prepared using an Abcor SWM-100 membrane. The details of the sulfonation of the UF liquor and the subsequent reaction of zirconium(IV) sulfate and hydrogen peroxide with the modified UF liquors are shown below. The ZrLS dispersants were tested in 25% bentonite muds and aged at 70° C. for 16 hours. Table XXXVII lists the mud data for these dispersants.

Example of the preparation of zirconium lignosulfonate

To a sample of 8% SO$_2$ sulfonated ultrafiltered intermediate (100 g of solids at 34% solids; example (8) was added 19.5% of Zr(SO$_4$)$_2$.4H$_2$O. While stirring at room temperature 11.25 ml of 30% hydrogen peroxide was added over a three minute period. This mixture was then heated with stirring in a 55° C. water bath for 30 minutes. This solution was spray dried to yield 114.0 g of zirconium lignosulfonate.

TABLE XXXVII

Ultrafiltered paper pulp Liquor Derived Zirconium Lignosulfonate Mud Data (Tested in Contaminated Mud System[a])

| | | | |
|---|---|---|---|
| Zr (g/100 g of intermediate solids) | 5.0 | 5.0 | 5.0 |
| $H_2O_2$ (g/100 g of intermediate solids) | 3.75 | 5.00 | 7.50 |
| $SO_2$ (g/100 g of UF liquor solids) | 8.0 | 8.0 | 8.0 |
| Unaged | | | |
| pH | 10.2/9.8 | 10.1/9.8 | 10.1/9.8 |
| Apparent Viscosity (mPa.s) | 25/19.5 | 31.5/19.5 | 54/19.5 |
| Plastic Viscosity (mPa.s) | 19/15 | 23/15 | 15/15 |
| Yield Value (lb/100 ft$^2$)[b] | 12/9 | 17/9 | 78/9 |
| Aged at 70° C. (for 16 hours) | | | |
| pH | 9.1/8.4 | 9.0/8.5 | 9.0/8.4 |
| Apparent Viscosity (mPa.s) | 19/18 | 21.5/18 | 45.5/18 |
| Plastic Viscosity (mPa.s) | 14/12 | 15/12 | 14/12 |
| Yield Value (lb/100 ft$^2$)[b] | 10/11 | 13/12 | 63/11 |
| 10 sec Gel (lb/100 ft$^2$)[b] | 8/8 | 8/8 | 46/8 |
| 10 min Gel (lb/100 ft$^2$)[b] | 18/17 | 21/17 | 47/17 |
| Fluid Loss (ml/30 min) | 20.0/27.4 | 16.6/27.1 | 22.5/27.4 |

[a]The data are presented as follows: Data for sample/Data for Standard CrLS (3.4% Cr)
[b]To convert lb/100 ft$^2$ to pascals, multiply by 0.4788.

EXAMPLE 13

Chromium based oil well drilling fluid dispersant made from sulfonated-ultrafiltrated liquor was compared with sulfonated sulfite liquor, ultrafiltered sulfite liquor and crude liquor. Sulfonation in conjunction with ultrafiltration in accordance with this invention provides substantially improved (i.e., outstanding) performance over either sulfonation or ultrafiltration processes alone. Ultrafiltration alone results in liquor which provides chromium based dispersants with poorer properties than the dispersant from crude liquor.

Additional studies show chromium lignosulfonate made from ultrafiltered (UF) liquor solids of highly purified spent sulfite liquor containing 99.2% sodium lignosulfonate significantly outperforms standard production dispersant at high temperature. In conjunction with a thermal decomposition study on lignosulfonate dispersants, a high purity UF liquor was prepared by diafiltration (DF) techniques using a 5,000 molecular weight cutoff membrane on paper pulp liquor. Presented in Tables XXXVIII and XXXIX are several samples made from DF, DF-sulfonated, sulfonated and crude liquors.

All four sample dispersants shown in Tables XXXVIII and XXXIX originated from essentially identical oxidation reactions on different liquors derived from the same paper pulp spent sulfite liquor. The first sample was prepared from the crude stripped thin liquor; the second from sulfonated concentrated liquor; the third was made from concentrated DF liquor; and the fourth from sulfonated concentrated DF liquor.

The stripped thin liquor was diafiltered using a Danish Sugar (DDS) Lab 20 UF unit. Both the concentrated crude liquor and the concentrated DF liquor were sulfonated with 8% sulfur dioxide as ammonium bisulfite. Generally the chromium based dispersants were prepared by sodium dichromate oxidation procedures. All four samples were spray dried and were evaluated for dispersant performance in the standard 28% calcium bentonite mud test with 70° C. aging. Their high temperature performance was determined in the contaminated mud test with 150° C. aging as described in the previous Examples.

Table XXXVIII contains the performance data for the four chromium based dispersants in the standard mud system with 70° C. aging. Table XXXIX contains similar data for the contaminated mud system with 150° C. aging. Crude liquor with only sulfonation yields a dispersant with acceptable properties in both mud systems. Without sulfonation or diafiltration the crude liquor produces a dispersant with unacceptable performance. However, the poorest properties are shown by the dispersant made directly from DF liquor without sulfonation.

It is believed that several of the favorable dispersant properties are probably accentuated by the paper pulp liquor. The chromium based dispersant obtained from the sulfonated liquor represents material similar to existing chromium based dispersants. In accordance with the invention, sulfonation in conjunction with ultrafiltration is required to attain the significantly improved chromium lignosulfonate performance. The chromium product from sulfonated DF liquor outperforms both the chromium product from sulfonated crude liquor and the standard. These properties of derived material also exceed those of chromium based dispersant material made from a commercial ultrafiltered product. The DF liquor without sulfonation yielded a poorer dispersant than the crude liquor. There appears to be no advantage in ultrafiltration without sulfonation. All four chromium based samples shown in the following tables were prepared under identical oxidation conditions. Only the liquor type was varied.

TABLE XXXVIII

| | | | | |
|---|---|---|---|---|
| Diafiltered liquor | Yes | No | No | Yes |
| Sulfonated liquor | Yes | Yes | No | No |
| Unaged Properties[a] | | | | |
| pH | 9.5/9.5 | 9.5/9.5 | 9.4/9.5 | 9.5/9.5 |
| Apparent viscosity (cps) | 24/34 | 30.5/33 | 46/33 | 88.5/34 |
| Plastic viscosity (cps) | 23/23 | 23/23 | 28/23 | 29/23 |
| Yield value (lb/100 ft$^2$) | 2/22 | 15/20 | 36/20 | 119/22 |
| Aged at 70° C. for 16 hours[a] | | | | |
| Aged pH | 8.5/8.2 | 8.2/8.2 | 7.7/8.2 | 8.2/8.2 |
| Adjusted pH | 9.6/9.6 | 9.5/9.6 | 9.5/9.6 | 9.5/9.6 |
| Apparent viscosity (cps) | 21.5/30.5 | 30/32 | 42.5/32 | 79/30.5 |
| Plastic viscosity (cps) | 21/21 | 20/22 | 21/22 | 31/21 |
| Yield value (lb/100 ft$^2$) | 1/19 | 20/18 | 43/18 | 96/19 |
| 10 sec gel (lb/100 ft$^2$) | 4/16 | 17/17 | 32/17 | 65/16 |
| 10 min gel (lb/100 ft$^2$) | 13/34 | 31/34 | 26/34 | 72/34 |
| Fluid loss (ml/30 min) | 19.2/22.0 | 20.4/22.2 | 17.0/22.2 | 17.0/22.0 |

[a]These data are presented as follows: data for sample/data for CrLS standard

TABLE XXXIX

| | | | | |
|---|---|---|---|---|
| Diafiltered Liquor | Yes | No | No | Yes |
| Sulfonated Liquor | Yes | Yes | No | No |
| Unaged Properties[a] | | | | |
| pH | 9.6/9.5 | 9.5/9.5 | 9.4/9.5 | 9.5/9.5 |
| Apparent viscosity (cps) | 29.5/41 | 38/41 | 69.5/41 | 139.5/41 |
| Plastic viscosity (cps) | 29/28 | 31/28 | 35/28 | 51/28 |
| Yield value (lb/100 ft$^2$) | 1/27 | 14/27 | 69/27 | 177/27 |
| Aged at 150° C. for 16 hours[a] | | | | |
| Aged pH | 7.0/6.7 | 6.6/6.7 | 6.6/6.7 | 6.8/6.7 |

TABLE XXXIX-continued

| | | | | |
|---|---|---|---|---|
| Apparent viscosity (cps) | 43/55 | 59.5/55 | 64/55 | 74/55 |
| Plastic viscosity (cps) | 23/20 | 19/20 | 21/20 | 30/20 |
| Yield value (lb/100 ft$^2$) | 40/70 | 81/70 | 76/70 | 88/70 |
| 10 sec gel (lb/100 ft$^2$) | 30/43 | 50/43 | 51/43 | 60/43 |
| 10 min gel (lb/100 ft$^2$) | 28/45 | 50/45 | 50/45 | 63/45 |
| Fluid loss (ml/30 min) | 26.9/27.8 | 7.6/27.8 | 21.6/27.8 | 8.4/27.8 |

$^a$These data are presented as follows: data for sample/data for CrLS standard

EXAMPLE 14

Chromium lignosulfonate based dispersant was prepared with 3.4% chromium in the finished dried product by techniques described previously. Sulfonation of the ultrafiltered SSL used 8.0% SO$_2$ as ammonium bisulfite according to the procedures described herein. The dispersant was evaluated in two mud tests. The first was the standard mud test with 70° C. aging for 16 hours. This test requires a dispersant sample load of 5.0 lb/bbl. While the standard was kept at this level the sample dispersant level varied from 5.0 to 3.0 lb/bbl. The second mud test involved a contaminated system with 150° C. aging for 16 hours. The standard used 8.0 lb/bbl while the sample dispersant varied from 8.0 to 5.0 lb/bbl.

Table XXXX contains the performance data for the standard mud test with 70° C. aging, while Table XXXXI shows the data for the contaminated mud system with 150° C. aging. In this high temperature test the dispersant loading ranged from the normal 8 lb/bbl to the lower 5 lb/bbl.

In the standard mud system test this chromium based dispersant exceeded the performance of the higher chromium content product. This performance continued when the loading was reduced from 5 to 4 lb/bbl. This performance was achieved with only 80% of the dispersant which contains 77.3% of the chromium as compared to the standard. A significant performance deterioration occurred when the loading was decreased to 3 lb/bbl in this test.

Testing this chromium based dispersant in the contaminated mud system with 150° C. aging resulted in similar performance. At the normal 8 lb/bbl loading this dispersant performed at significantly improved levels. Even decreasing the loading to 6 lb/bbl resulted in aged mud performance at the level of the standard. At this lower loading level (75% of normal), the unaged properties were still better than the standard. A further reduction to 5 lb/bbl resulted in still acceptable performance in this high temperature test.

TABLE XXXX

| | | | |
|---|---|---|---|
| Sulfonation SO$_2$ Level (%) | 8 | 8 | 8 |
| Mud Test Sample Load (lb/bbl) | 5 | 4 | 3 |
| Unaged Properties$^a$ | | | |
| pH | 9.6/9.5 | 9.5/9.5 | 9.5/9.5 |
| Apparent Viscosity (cps) | 25/31 | 31/32 | 42/32 |
| Plastic Viscosity (cps) | 22/21 | 23/22 | 17/22 |
| Yield Value (lb/100 ft.$^2$) | 6/20 | 16/20 | 50/20 |
| Aged at 70° C. for 16 hours$^a$ | | | |
| Aged pH | 8.4/8.2 | 8.2/8.2 | 8.0/8.2 |
| Adjusted pH | 9.5/9.5 | 9.5/9.6 | 9.5/9.6 |
| Apparent Viscosity (cps) | 23/30 | 29.5/30 | 46/30 |
| Plastic Viscosity (cps) | 20/20 | 21/20 | 20/20 |
| Yield Value (lb/100 ft.$^2$) | 6/20 | 17/20 | 52/20 |
| 10 sec. gel (lb/100 ft.$^2$) | 5/18 | 16/17 | 39/17 |
| 10 min. gel (lb/100 ft.$^2$) | 16/30 | 32/32 | 38/32 |
| Fluid Loss (ml/30 min) | 20.2/22.2 | 21.1/22.3 | 23.3/22.3 |

$^a$These data are represented as follows: Data for Sample/Data for CrLS standard

TABLE XXXXI

| | | | | |
|---|---|---|---|---|
| Sulfonation SO$_2$ Level (%) | 8 | 8 | 8 | 8 |
| Mud Test Sample Load (lb/bbl) | 8 | 7 | 6 | 5 |
| Unaged Properties$^a$ | | | | |
| PH | 9.5/9.5 | 9.5/9.4 | 9.6/9.4 | 9.4/9.4 |
| Apparent Viscosity (cps) | 34/41 | 36.5/43 | 38/43 | 43.5/43 |
| Plastic Viscosity (cps) | 32/30 | 33/30 | 32/30 | 31/30 |
| Yield Value (lb/100 ft.$^2$) | 4/22 | 7/26 | 8/26 | 25/26 |
| Aged at 150° C. for 16 hours$^a$ | | | | |
| Aged pH | 7.0/6.7 | 6.6/6.4 | 6.6/6.4 | 6.6/6.4 |
| Apparent Viscosity (cps) | 95/106 47.5/53 | 110/116 55/58 | 121/116 60.5/58 | 126/116 63/58 |
| Plastic Viscosity (cps) | 22/20 | 21/21 | 22/21 | 21/21 |
| Yield Value (lb/100 ft.$^2$) | 51/66 | 68/74 | 77/74 | 84/74 |
| 10 sec. gel (lb/100 ft.$^2$) | 34/42 | 43/46 | 51/46 | 51/46 |
| 10 min. gel (lb/100 ft.$^2$) | 34/44 | 46/48 | 49/48 | 55/48 |
| Fluid Loss (ml/30 min) | 28.2/28.3 | 28.0/28.0 | 29.4/28.0 | 29.9/28.0 |

$^a$These data are represented as follows: Data for Sample/Data for CrLS standard

What is claimed is:

1. A method of making an additive for drilling mud from soluble base spent sulfite liquor comprising:
    ultrafiltering said soluble base spent sulfite liquor;
    separating resulting concentrate and filtrate;
    sulfonating the said concentrate; and
    reacting said sulfonated concentrate with a metal salt in the presence of an oxidizing agent, said metal salt being selected from the group consisting of chromium, ferrous, ferric, titanium and zirconium salts to produce a metal lignosulfonate additive for drilling mud.

2. The method of claim 1 wherein said step of sulfonating said concentrate comprises reacting said concentrate with a bisulfite at a temperature of between 80° and 200° C.

3. The method of claim 2 wherein said step of reacting said concentrate with a bisulfite comprises the steps of:
    adding ammonium to a solution of said concentrate and water;
    mixing said solution;
    adding ammonium bisulfite to said solution; and
    heating said solution to approximately 165° C.

4. The method of claim 1 and further comprising;
    steam stripping said soluble base spent sulfite liquor prior to ultrafiltration so as to remove a substantial proportion of the sulfur dioxide present in said liquor.

5. The method of claim 1 wherein said concentrate contains greater than about 13% total solids.

6. The method of claim 1 wherein said concentrate contains less than 2% free sugar content.

7. The method of claim 1 wherein said concentrate comprises soluble base lignosulfonate.

8. The method of claim 1 wherein said ultrafiltration of said soluble base spent sulfite liquor comprises the steps of
  passing said soluble base spent sulfite liquor through a membrane having 5,000-30,000 dalton pores;
  diluting the resulting concentrate with water back to its original weight; and
  repeating said steps a plurality of times so as to decrease the average molecular chain length distribution of said concentrate.

9. The method of claim 1 wherein said metal salt is selected from the group consisting of ferrous sulfate and its hydrates, said oxidizing agent comprises hydrogen peroxide and said step of reacting said sulfonated concentrate comprises;
  adding said metal salt to a solution of said concentrate and water;
  cooling said solution;
  adding hydrogen peroxide to said solution;
  heating said solution while simultaneously mixing; and
  cooling said resulting solution.

10. The method of claim 1 and including the additional step of spray drying said resulting solution.

11. The method of claim 1 wherein said metal salt comprises titanium sulfate, said oxidizing agent comprises hydrogen peroxide, and said step of reacting said metal salt in the presence of an oxidizing agent comprises;
  adding titanium sulfate to a solution of said concentrate and water;
  adding hydrogen peroxide to said solution;
  heating said solution while simultaneously mixing; and
  cooling said solution.

12. The method of claim 1 wherein said metal salt comprises zirconium sulfate tetrahydrate, said oxidizing agent comprises hydrogen peroxide, and said step of reacting said metal salt in the presence of an oxidizing agent comprises;
  adding zirconium sulfate tetrahydrate to a solution of said concentrate and water;
  adding hydrogen peroxide to said solution while continuously mixing;
  heating said solution while continuously mixing; and
  cooling said solution.

13. The method of claim 1 wherein said metal salt comprises sodium dichromate and said step of reacting said metal salt comprises;
  heating a first solution of said concentrate and water;
  stirring a mixture of sulfuric acid and sodium dichromate into said first solution of said concentrate and water to create a second solution;
  heating said second solution while continuously mixing;
  cooling said second solution; and
  spray drying said second solution.

14. A process for preparing from spent sulfite liquor a drilling mud additive having improved dispersing properties comprising the steps of;
  ultrafiltering said soluble base spent sulfite liquor;
  separating the resulting concentrate and filtrate;
  sulfonating said concentrate; and
  reacting said sulfonated concentrate with a metal salt in the presence of an oxidizing agent, said metal salt being selected from the group consisting of chromium, ferrous, ferric, titanium and zirconium salts to produce a metal lignosulfonate additive for drilling mud.

15. An additive for drilling mud comprising a metalized lignosulfonate having a molecular weight of between 80,000 and 140,000 and an average molecular chain length distribution of approximately 2.5, or less.

16. The additive of claim 15 wherein said metal lignosulfonate contains less than 2% free sugar.

17. The additive of claim 15 wherein said drilling mud consists essentially of a clay-water slurry.

18. A drilling mud additive comprising ultrafiltered metalized lignosulfonate.

19. A chromeless oil well drilling mud dispersant comprising ultrafiltered metal sulfonated lignosulfonate wherein said metal is selected from the group consisting of ferrous, ferric, titanium and zirconium.

20. The drilling mud additive of claim 18 wherein said metal is selected from the group consisting of ferrous, titanium, and zirconium.

21. The drilling mud additive of claim 18 wherein said metal lignosulfonate contains less than 2% free sugar.

22. An additive for drilling mud comprising ultrafiltered metal sodium based lignosulfonate.

23. An additive for drilling mud comprising spray dried ultrafiltered metal sodium based lignosulfonate.

24. A drilling mud dispersant comprising ultrafiltered metalized lignosulfonate.

25. The dispersant of claim 24 wherein said dispersant is substantially sugar free.

26. The dispersant of claim 24 wherein said metalized lignosulfonate comprises chrome lignosulfonate.

* * * * *

UNITED STATES PATENT AND TRADEMARK OFFICE
CERTIFICATE OF CORRECTION

PATENT NO. : 4,728,727
DATED : March 1, 1988
INVENTOR(S) : Marten Reintjes and Craig B. Marken It is certified that error appears in the above-identified patent and that said Letters Patent is hereby corrected as shown below:

Column 16, Line 44, "bisulfate" should be --bisulfite--.

Column 20, Table XIX, "10.0/10.10" should be --10.0/10.0--.

Column 20, Table XIX, "Yield viscosity" should be --Yield value--.

Column 20, Table XIX, "CrLs" should be --CrLS--.

Column 21, Table XX, "CrLs" should be --CrLS--.

Column 21, Table XXII, "CrLs" should be --CrLS--.

Column 23, Table XXV, "Aged pH" should not be there.

Column 23, Table XXV, "CrLs" should be --CrLS--.

Column 26, Line 48, "perparation" should be --preparation--.

Column 26, Line 56, "The mixture" should be --This mixture--.

Column 26, Table XXIX, "apparent" should be --Apparent--.

Column 27, Table XXIX, "(lb/100 ft$^2$)" should be --(lb/100 ft$^2$)$^b$--.

Column 27, Table XXXI, "CrLs" should be --CrLS--. (appears twice)

Column 27, Table XXXI, "29.9%" should be --29.94%--.

Column 30, Line 68, "example (8)" should be --example 8)--.

UNITED STATES PATENT AND TRADEMARK OFFICE
CERTIFICATE OF CORRECTION

PATENT NO. : 4,728,727
DATED : March 1, 1988
INVENTOR(S) : Marten Reintjes et al It is certified that error appears in the above-identified patent and that said Letters Patent is hereby corrected as shown below:

Column 34, Table XXXXI, "PH" should be --pH--.

Signed and Sealed this

Sixth Day of June, 1989

Attest:

DONALD J. QUIGG

Attesting Officer

Commissioner of Patents and Trademarks